(12) United States Patent
Mikhailov et al.

(10) Patent No.: US 11,816,255 B2
(45) Date of Patent: *Nov. 14, 2023

(54) HEAD MOUNTED DISPLAY WITH ADJUSTABLE HEADBAND

(71) Applicant: Sony Interactive Entertainment Inc., Tokyo (JP)

(72) Inventors: Anton Mikhailov, Foster City, CA (US); Eric Larsen, Foster City, CA (US); Jeffrey Roger Stafford, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,348

(22) Filed: Aug. 3, 2021

(65) Prior Publication Data

US 2021/0365110 A1 Nov. 25, 2021

Related U.S. Application Data

(63) Continuation of application No. 16/027,211, filed on Jul. 3, 2018, now Pat. No. 11,079,838, which is a
(Continued)

(51) Int. Cl.
*G06F 3/01* (2006.01)
*G06F 3/0346* (2013.01)
(Continued)

(52) U.S. Cl.
CPC ......... *G06F 3/012* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 4,051,534 A * 9/1977 Dukich ............... H04N 5/2256
348/E5.029
4,797,736 A * 1/1989 Kloots ................. F21V 21/084
348/370
(Continued)

FOREIGN PATENT DOCUMENTS

JP          09292588 A  * 11/1997
JP        2010169742 A  *  8/2010
KR       20140025121 A  *  3/2014

*Primary Examiner* — Kirk W Hermann
(74) *Attorney, Agent, or Firm* — Penilla IP, APC

(57) ABSTRACT

A head mounted display is provided. The head mounted display includes an optics block having a display screen. The optics block has a forward-facing region, a lower-facing region, a top-facing region, an inside-facing region, and side regions that extend from the forward-facing region toward the inside-facing region. The display screen is viewable from the inside-facing region. A band adjustment unit is located opposite the optics block. A headband has a front portion and an adjustable portion. The adjustable portion of the headband is connected to the band adjustment unit to contract a size of the headband or expand the size of the headband. The front portion of the headband has a connection to the top-facing region of the optics block that is proximate to the inside-facing region. A pad is disposed inside of the front portion of the headband. The pad provides for at least partial support of the optics block when the head mounted display is worn by a user.

7 Claims, 19 Drawing Sheets

Related U.S. Application Data continuation of application No. 15/653,465, filed on Jul. 18, 2017, now Pat. No. 10,409,364, which is a continuation of application No. 14/658,123, filed on Mar. 13, 2015, now Pat. No. 9,710,057.

(60) Provisional application No. 61/953,730, filed on Mar. 14, 2014.

(51) Int. Cl.

| | |
|---|---|
| *G06T 19/00* | (2011.01) |
| *G02B 27/01* | (2006.01) |
| *G06T 7/73* | (2017.01) |
| *G06T 7/246* | (2017.01) |
| *G02B 27/00* | (2006.01) |

(52) U.S. Cl.
CPC ....... *G02B 27/0172* (2013.01); *G06F 3/0346* (2013.01); *G06T 7/251* (2017.01); *G06T 7/73* (2017.01); *G06T 19/006* (2013.01); *G06T 2207/10016* (2013.01); *G06T 2207/30204* (2013.01)

(56) References Cited

U.S. PATENT DOCUMENTS

| | | | | |
|---|---|---|---|---|
| 5,583,795 | A * | 12/1996 | Smyth | A61B 3/0025 702/92 |
| 5,746,693 | A * | 5/1998 | Spitz | A61B 1/00147 600/162 |
| 5,767,820 | A * | 6/1998 | Bassett | G06F 3/011 348/E5.145 |
| 5,954,642 | A * | 9/1999 | Johnson | G02B 27/0176 600/300 |
| 6,050,717 | A * | 4/2000 | Kosugi | G05B 19/409 700/17 |
| D427,982 | S * | 7/2000 | Ishii | D14/372 |
| D436,086 | S * | 1/2001 | Ishii | D14/126 |
| 2001/0047693 | A1* | 12/2001 | Saito | G02B 27/0176 74/159 |
| 2002/0008677 | A1* | 1/2002 | Saito | G02B 27/0176 345/8 |
| 2005/0168812 | A1* | 8/2005 | Lehrl | G02B 27/0176 359/407 |
| 2012/0013984 | A1* | 1/2012 | Ikeda | A61B 90/50 359/507 |
| 2013/0027665 | A1* | 1/2013 | Bernert | A61B 5/6803 351/209 |
| 2013/0127980 | A1* | 5/2013 | Haddick | G06F 3/013 348/14.08 |
| 2016/0184481 | A1* | 6/2016 | Thangapazham | A61P 17/00 424/93.3 |

* cited by examiner

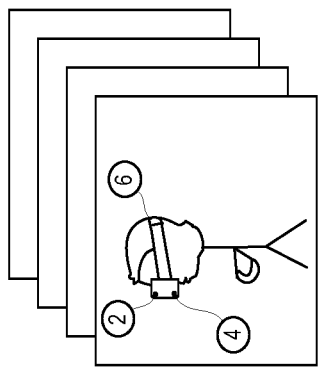
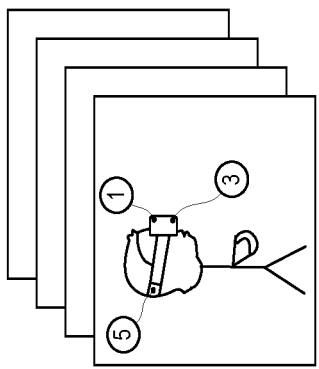
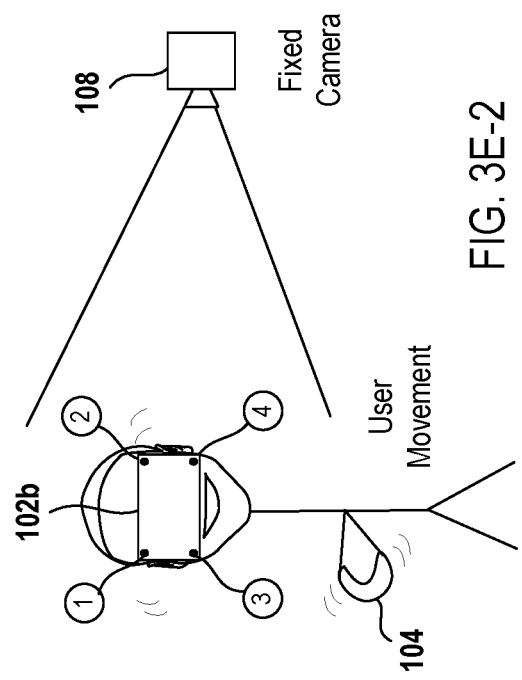
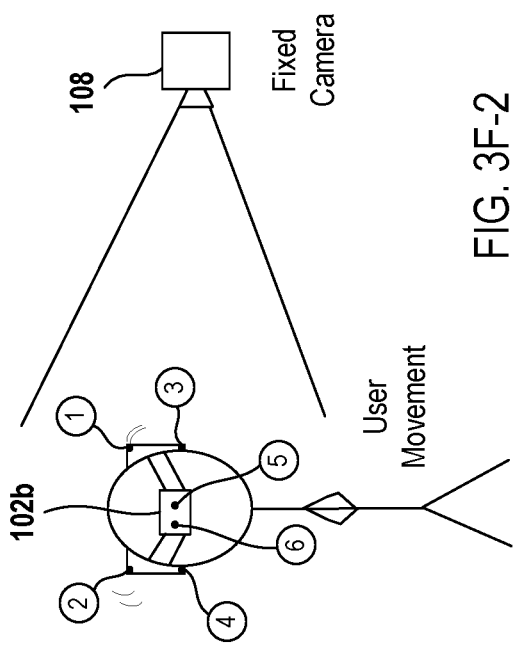
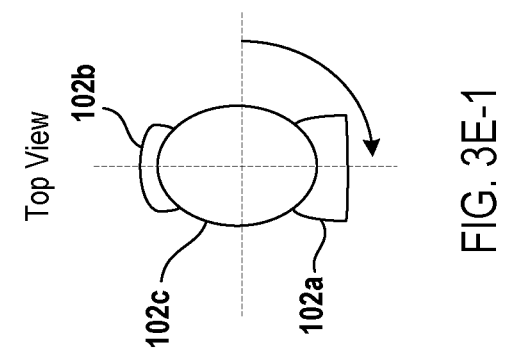
FIG. 3E-1
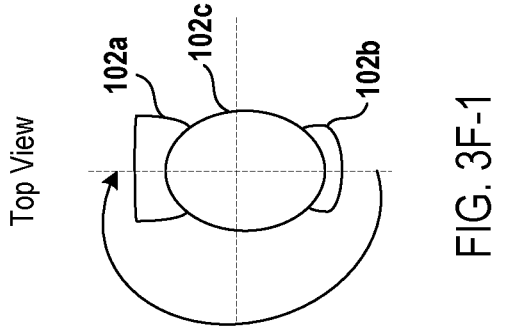
FIG. 3F-1

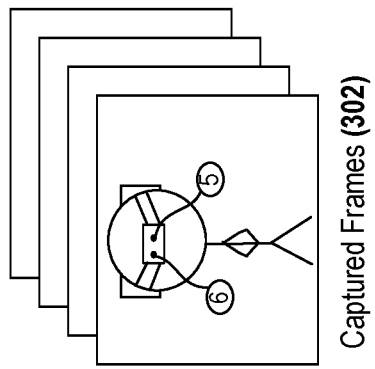
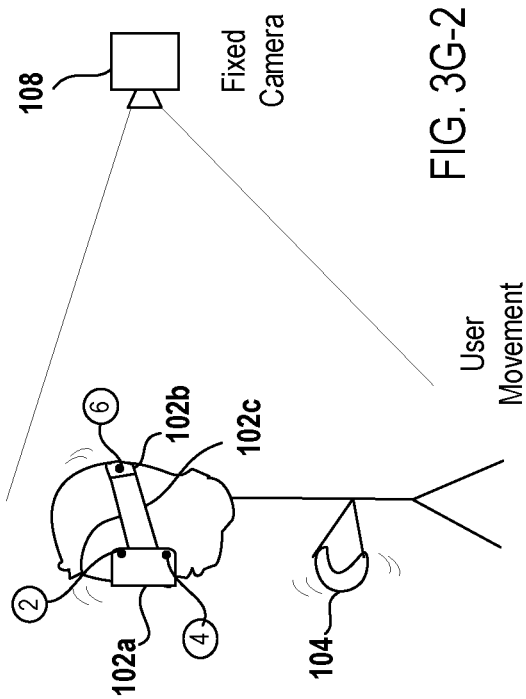
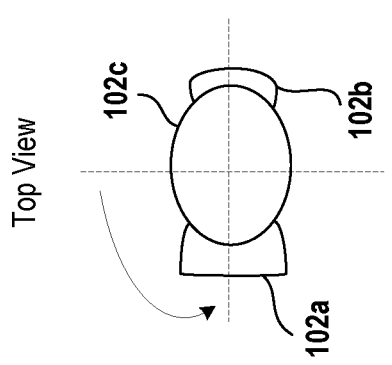
FIG. 3G-3
FIG. 3G-2
FIG. 3G-1

HEAD MOUNTED DISPLAY WITH ADJUSTABLE HEADBAND

CLAIM OF PRIORITY

The present application is a Continuation of U.S. patent application Ser. No. 16/027,211, filed on Jul. 3, 2018, (U.S. Pat. No. 11,079,838, issued on Aug. 3, 2021), entitled "Head-Mounted Display with Adjustable Headband", which is a further Continuation of U.S. Patent Ser. No. 15/653,465, filed on Jul. 18, 2017, (U.S. Pat. No. 10,409,364, issued on Sep. 10, 2019), entitled "Methods and Systems Tracking Head Mounted Display (HMD) and Calibrations for HMD Headband Adjustments", which claims priority from U.S. patent application Ser. No. 14/658,123, filed on Mar. 13, 2015, (U.S. Pat. No. 9,710,057, issued on Jul. 18, 2017), entitled "Methods and Systems Tracking Head Mounted Display (HMD) and Calibrations for HMD Headband Adjustments", which is a non-provisional of U.S. Provisional Application No. 61/953,730, filed on Mar. 14, 2014, and entitled "Methods and Systems Tracking Head Mounted Display (HMD) and Calibrations for HMD Headband Adjustments", which are herein incorporated by reference.

1. Field of the Invention

The present invention relates to methods and systems for tracking position and orientation of a head mounted display (HMD) and calibrations made for headband adjustments of the HMD.

BACKGROUND

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming services and systems may include those provided by Sony Playstation®, which are currently sold as game consoles, portable game devices, and provided as services over the cloud. As is well known, the game console is designed to connect to a monitor (usually a television) and enable user interaction through handheld controllers. The game console is designed with specialized processing hardware, including a CPU, a graphics processor for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide an immersive experience to the user. Current tracking techniques of an HMD's position and orientation still need improvement, to enable improved rendering of content by the HMD.

It is in this context that embodiments of the invention arise.

SUMMARY

Embodiments of the present invention provide methods and systems for enabling head mounted displays (HMDs) to improve tracking of position and movements of the HMD when a user is wearing the HMD and viewing and/or interacting with multimedia content. The systems and method enable dynamic calibration to account for adjustments in a headband of the HMD, so that distance separations between front tracking LED lights and rear tracking LED lights can be accurately estimated. The calibration can be updated from time to time, such as when a user adjusts the headband size, in between sessions, when sensors determine that adjustment has occurred, and when other users adjust the headband for a better fit. It should be appreciated that the present invention can be implemented in numerous ways, such as a process, an apparatus, a system, a device or a method on a computer readable medium. Several inventive embodiments of the present invention are described below.

In one embodiment, a head mounted display is provided. The head mounted display includes an optics block having a display screen. The optics block has a forward-facing region, a lower-facing region, a top-facing region, an inside-facing region, and side regions that extend from the forward-facing region toward the inside-facing region. The display screen is viewable from the inside-facing region. A band adjustment unit is located opposite the optics block. A headband has a front portion and an adjustable portion. The adjustable portion of the headband is connected to the band adjustment unit to contract a size of the headband or expand the size of the headband. The front portion of the headband has a connection to the top-facing region of the optics block that is proximate to the inside-facing region. A pad is disposed inside of the front portion of the headband. The pad provides for at least partial support of the optics block when the head mounted display is worn by a user.

In one embodiment, a method is provided. The method includes capturing video frames using a camera. The video frames are configured to capture markers on a head mounted display (HMD), and the markers on the HMD are analyzed in the captured video frames to determine position and orientation of the HMD for processing changes to scenes generated during rendering of multimedia content that is displayed by the HMD. The method further includes estimating a separation distance between a marker on a front unit of the HMD and a marker on a rear section of the HMD. The front unit and the rear section are coupled together by an adjustable headband. The estimating includes analyzing a plurality of video frames and inertial data captured when the video frames were captured, and the analyzing produces an estimated separation distance between the marker on the front unit of the HMD and a marker on the rear section of the HMD. The estimated separation distance is used during further tracking of position and orientation of the HMD, as markers on the front unit and the rear section are captured and analyzed from the captured video frames.

In another embodiment, a system is provided. The system includes a computing system and a head mounted display (HMD) in communication with the computing system. The HMD includes a front unit having a screen for displaying multimedia content. The front unit has a marker disposed thereon, and inertial sensors for generating inertial data indicative of changes in position and orientation of the HMD. In one embodiment, the inertial data produces a set of values that quantify changes in rotation and changes in position of the HMD. The set of values can be mapped to identify locations of the markers of the HMD in image data of the plurality of the captured video frames. The HMD also includes a rear section of the HMD connected to the front unit by an adjustable headband. The rear section has a marker disposed thereon. The system further includes a camera in communication with the computing system. The camera is configured to capture video frames of the HMD during a session of use. The captured video frames from time to time are configured to include the marker of the front unit and the marker of the rear section. The computing system processes the captured video frames to identify the markers of the front unit and the rear section against the generated inertial data. The processing produces an estimated separation between the marker of the front unit and the marker of the rear section. The estimated separation is used for improved tracking during use.

In yet another embodiment, a head mounted display (HMD) is provided. The HMD includes a circuit for communicating with a computing system that processes multimedia content for display in the HMD. Further included is a front unit of the HMD that has a screen for displaying multimedia content, and the front unit has a set of LEDs. The HMD includes an accelerometer and gyroscope disposed in the front unit of the HMD. A rear section of the HMD is provided having a set of LEDs. A headband connecting the front unit to the rear section is included, such that adjustment of the headband changes a separation distance between at least one of the set of LEDs of the front unit and at least one of the set of LEDs of the rear section. Wherein calibration of the separation distance is performed from time to time to produce and estimated separation distance for tracking of the HMD during use.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIGS. 3C-1 through 3G-3 illustrate examples of a user wearing an HMD that is strapped to the user's head via a headband and image data captured for the same, in accordance with an embodiment of the invention.

DETAILED DESCRIPTION

Figure 1A:
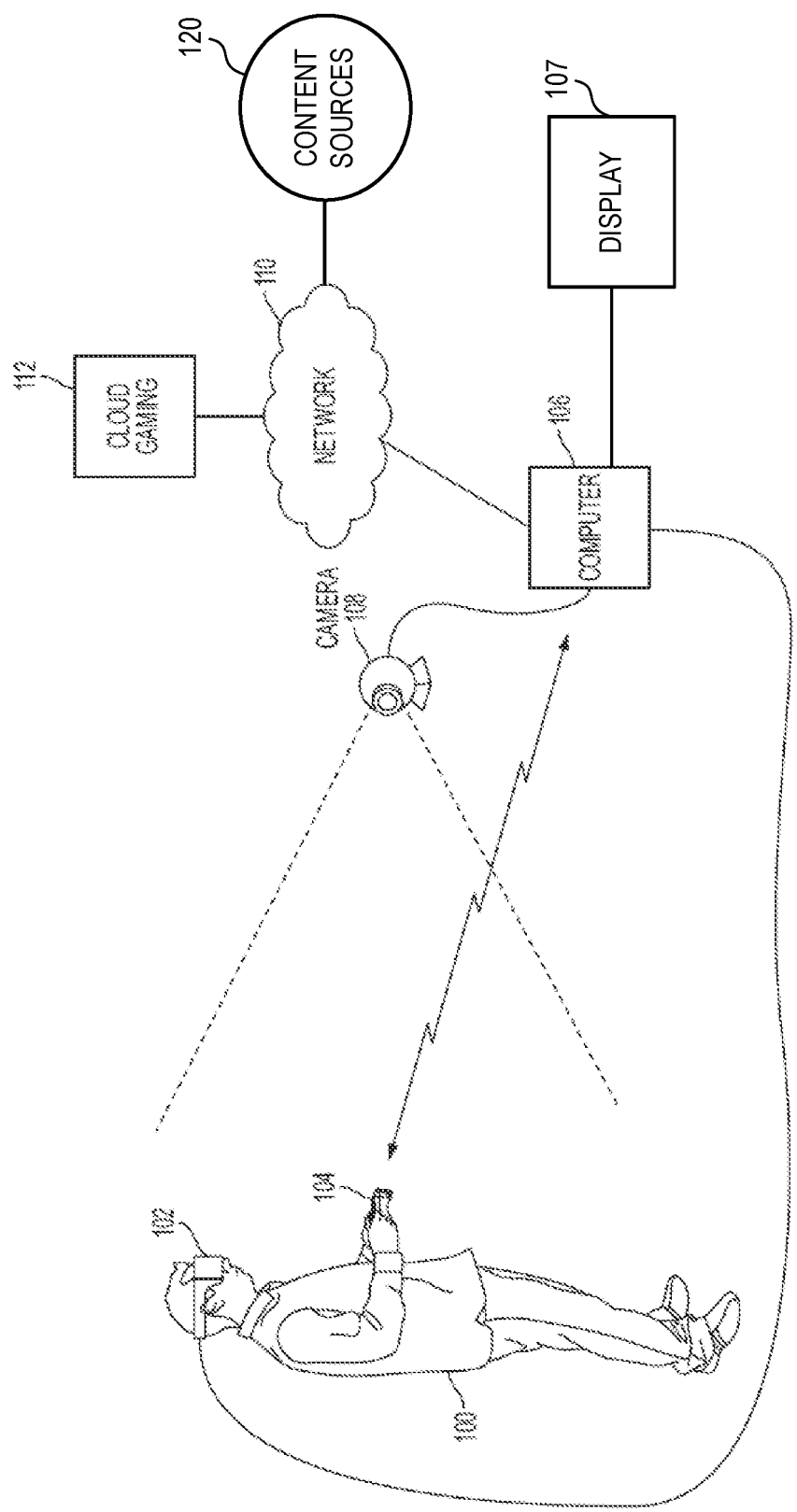
FIG. 1A illustrates a system for interactive gameplay of a video game, in accordance with an embodiment of the invention.

In one embodiment, the systems and methods described herein provide for tracking the position and movements in position of a head mounted display (HMD) when a user is wearing the HMD and viewing and/or interacting with multimedia content. The systems and method enable calibration to account for adjustments in a headband of the HMD, so that distances of markers (e.g., LED lights) disposed on the HMD and the headband are accurately estimated. As described below, the calibration can be updated from time to time, such as when a user adjusts the headband size during a session of use, in between sessions, when sensors determine that adjustment has occurred, and when other users adjust the headband for a better fit.

Methods and systems for performing calibrations will therefore ensure that the estimated distances between markers are updated to be as close as possible to the actual current physical distances on the HMD, which provides for more accurate tracking of the HMD for position and movement during use. It will be obvious, however, to one skilled in the art, that the present invention may be practiced without some or all of these specific details. In other instances, well known process operations have not been described in detail in order not to unnecessarily obscure the present invention.

In one example, the HMD worn by a user provides the user access to view rich multimedia content, which can include video games, movies, internet content, and other types of interactive and non-interactive content. The tracking of the HMD is performed using a combination of systems. The systems include, without limitation, inertial sensors in the HMD and optical tracking using one or more cameras. A camera used in optical tracking can capture video of the user wearing the HMD, so when the user moves around with the HMD the video frames can be analyzed to determine position, orientation and movements of the HMD. Broadly speaking, some content presented by the HMD is dynamically dependent on movement of the HMD.

For example, if the HMD provides a view into a scene, the user is able to naturally move his or her head to view other parts of the scene. In a video gaming example, a user wearing the HMD can move his or her head in any direction to move about in and around a virtual scene. In one embodiment, the virtual scene is rendered in a rich three dimensional (3D) format. Consequently, in order to smoothly render content in the HMD, the movement of the HMD will be tracked with high fidelity. In one configuration, the HMD is configured to communicate with a client system 106, which renders the content presented to the HMD. The content (e.g., game, movie, video, audio, images, multimedia, etc.), in some embodiments may be streamed from a remote server or servers using cloud gaming infrastructure. In some examples, the content is downloaded to the client system 106 for rendering and then transferred to the HMD.

As noted above, the tracking may include the use of inertial sensors that are disposed within the HMD. Example inertial sensors include one or more accelerometers and one or more gyroscopes. Some implementations may include more or less inertial sensors. In addition to inertial sensors, the HMD can be tracked using a camera. The HMD is, in one embodiment, configured with several lights (e.g., light emitting diodes (LEDs)), which act as markers. The markers can then be easily identified by analyzing, by the client system 106, one or more video frames captured by the camera. In one configuration, the HMD includes four LEDs on the four corners of the front unit 102a (e.g., also referred to herein as the optics block) and two LEDs on the rear section (e.g., band adjustment unit 102b).

The front unit 102a, in one example, includes a front face and a side face on each side, wherein the front face and side faces define a substantially continuous surface. In various examples provided herein, the front LEDs are defined in a housing of the front unit 102a, and disposed with transparent plastic that can illuminate when the LEDs are turned on. Further, in some embodiments, the front LEDs are configured to be partially disposed on the front surface and partially on the side surface, to define a partial L-shape, or curved L-shape, or boomerang shape, or a curved rectangle, or curved line, or a spot, or circle, or a pattern, or combinations thereof.

This shape allows for tracking of the front unit 102a when the user is directly facing the camera 108 and when the user starts to turn away from direct facing of the camera 108. As the user faces to the side and further away from the directly facing the camera, the front LEDs will be visible until only the LEDs on one side of the front are visible and one of the LEDs on the backside are visible. This is the transition from the front LEDs to the front and back LEDs. Due to this transition, as noted above, the separation distance between the front and back LEDs is needed, so that accurate tracking can proceed.

Still further, when the user wearing the HMD is facing the camera, the camera should be able to view all four LEDs. The separation of the four front LEDs is known to the client system 106. For example, a geometric model of the HMD can be accessed by programs executed on the client system 106, to determine depth (relative to the camera) and orientation of the user's head when wearing the HMD. For instance, because the four LEDs are, in one embodiment, disposed on the corners (e.g., outlining a rectangular shape), it is possible to determine from the captured video frames if the user is viewing down, up or to the sides.

However, because the interactive content that can be rendered in the HMD can be virtually boundless, a user is able to view and interact with the virtual scene in most every dimension. A user wearing an HMD, therefore, may decide to turn his or her head in any direction, which is not necessarily always forward facing with respect to the camera. In fact, depending on the content rendered (e.g., immersive interactive video games, moves, virtual tours, clips, audio, and combinations thereof), users will many times be facing to the sides of the camera and directly away from the camera.

During such interactive sessions, the camera tracking the HMD will go from seeing the front four LEDs to sometimes seeing the side of two of the front LEDs and also one of the rear LEDs. Although the front four LEDs remain in a fixed relative orientation, based on the geometric model of the HMD, the rear LEDs may change in position depending on an adjusted setting of a headband of the HMD. For instance, if a user with a smaller head adjusts the headband to fit, the distance between the front LEDs and the rear LED (e.g., when viewed from the side) will be closer, relative to an adjusted setting for a larger head of another user.

To account for the changes in headband adjustments, a process is configured to calibrate the geometric model of the HMD, so that the separation between the front LEDs and the rear LED (e.g., when viewed from the side when the user turns his or her head away from normal to the camera) can be used to accurately render scene content to the HMD and provide the scenes from the desired perspective, angle and/or orientation. In one implementation, the geometric model is a computer model, which stores/contains dimensions and/or three-dimensional outlines of the HMD 102, similar to what a computer aided design (CAD) drawing may show. However, the geometric model is not displayed as a drawing, but instead is stored as a data set, that is accessible by games, or movies, or software, or firmware, or hardware, or combinations thereof to enable accurate tracking.

Still by way of example, the three-dimensional outlines of the HMD 102 can include, in one embodiment, outlines of each shape of the HMD and the shapes of the LED regions, the locations of the LEDs relative to shapes in the outline, the angles and contours of the physical structures of the HMD, and data sets that define measurements of the features and constructs of the HMD. In particular, the geometric model may include dimensional data that define the exact relative placement of the LEDs on the front unit 102a. However, because the rear LEDs are coupled to a headband that is adjustable, the separate distance must be updated during calibration, so that the geometric model can be updated with a more accurate distance between the front and rear LEDs.

In one embodiment, the calibration process is configured to initiate after analysis of the video frames determines that one of the rear LEDs is visible (e.g., starting from when only the front LEDs are visible). For example, at the start of a session (e.g., game play or interactive session), it is common that the user will face the HMD toward the camera. At some point, the user will turn his head away from the camera, which will expose at least one of the rear LEDs. At this point, the analysis of the video frames, which is ongoing, will detect the appearance of the rear LED.

In one embodiment, the process will analyze several frames as the user continues to move to associate the visible rear LED and the visible front LEDs with inertial data. The inertial data present for each frame, for example, is used to associate an estimated separation distance between the visible rear LED and the visible front LEDs. In one example, gyroscope data from the HMD is used to determine the rotation motion by the user's head, as the HMD moves. Further, by way of example, accelerometer data from the HMD is used to determine movement, such as position (e.g., tilt/pitch) and rotation.

Thus, using the image data from the captured video frames of the HMD (i.e., when the rear and front LEDs are visible), the inertial data in combination with the image data will render an estimated separation distance between the front LEDs and the rear LED, for the current size setting of the headband of the HMD. This data is then used to calibrate the geometric model of the HMD, which includes the estimated separation distance. In one embodiment, the calibration can be updated from time to time, and can also be calibrated independently for each side of the HMD.

Once the calibration to the geometric model of the HMD is complete, the user may proceed to interact during the session. However, once the session is done, it is possible that a different user may wish access to the HMD. At such time, it is also likely that the new user will adjust the headband of the HMD to another size, which will cause a change in the actual separation distance between the front LEDs and the rear LEDs. In one embodiment, a new session can begin, using either the prior updated calibration or the dimensions from the original geometric model.

At the start, the game play or interactive session will proceed smoothly, wherein the scene presented in the HMD will render based on movements in the user's head. This will be so, while the user wearing the HMD is facing forward toward the camera, wherein the fixed separation between the four LEDs in the front of the HMD are known. However, once the user turns away from the camera and the rear LED is found, the system, without automatic calibration, would see a jump or pop in the content rendered in the HMD. This is so, as the tracking of the HMD, which utilizes marker tracking of the LEDs to identify position, would be out of sync with the true position of the HMD.

In one embodiment, a determination as to whether re-calibration is needed is performed each time the user faces the HMD to the side, wherein the front and rear LEDs become visible (i.e., coming from when only the front or only the rear LEDs are visible). In one example, if the calibration occurred for a current session, and the session is on-going with a current calibration, the system will run a calibration in the background to determine if the current calibration is still within a pre-defined tolerance margin. For example, if the same user adjusted the headband during game play, or took off the HMD for a minor size adjustment, or some other person tried on the HMD momentarily, then the actual separation between the front and the rear would be different than what was used to estimate the separation during an initial calibration.

The tolerance margin is configured or chosen so that if the new background calibration shows that rendering glitches, skips or pops would likely occur (e.g., in the video images rendered in the HMD), then the new calibration should become the current calibration.

In still another embodiment, the HMD will include a headband adjustment detector that will set a flag. The flag can be read by the system and/or game executing, which can be used to require recalibration of the geometric model. For instance, if the user adjusts the headband during use of the HMD, the system can be alerted via the flag that the calibration should be re-run. The same may be true if the adjustment occurred because another user tried on the HMD, even if the same session is in progress. In still further embodiments, a flag can be generated upon the start of a new session or when the system detects that the HMD has been still or has not moved for some time. Such indicators can be viewed as possibility that the headband may have been adjusted, before the new session occurred or even during a session.

FIG. 1A illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game or other content to the user 100. The HMD 102 is configured to provide an immersive experience to the user by virtue of its provision of display mechanisms (e.g., optics and display screens) in close proximity to the user's eyes and the format of the content delivered to the HMD. In one example, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer, including but not limited to, a gaming console, personal computer, laptop, tablet computer, mobile device, cellular phone, tablet, thin client, set-top box, media streaming device, etc. In some embodiments, the HMD 102 can connect directly to the internet, which may allow for cloud gaming without the need for a separate local computer. In one embodiment, the computer 106 can be configured to execute a video game (and other digital content), and output the video and audio from the video game for rendering by the HMD 102. The computer 106 is also referred to herein as a client system 106a, which in one example is a video game console.

The computer may, in some embodiments, be a local or remote computer, and the computer may run emulation software. In a cloud gaming embodiment, the computer is remote and may be represented by a plurality of computing services that may be virtualized in data centers, wherein game systems/logic can be virtualized and distributed to user over a network.

The user 100 may operate a controller 104 to provide input for the video game. In one example, a camera 108 can be configured to capture image of the interactive environment in which the user 100 is located. These captured images can be analyzed to determine the location and movements of the user 100, the HMD 102, and the controller 104. In one embodiment, the controller 104 includes a light (or lights) which can be tracked to determine its location and orientation. Additionally, as described in further detail below, the HMD 102 may include one or more lights which can be tracked as markers to determine the location and orientation of the HMD 102 in substantial real-time during game play.

The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In some embodiments, computer 106 can execute games locally on the processing hardware of the computer 106. The games or content can be obtained in any form, such as physical media form (e.g., digital discs, tapes, cards, thumb drives, solid state chips or cards, etc.) or by way of download from the Internet, via network 110. In another embodiment, the computer 106 functions as a client in communication over a network with a cloud gaming provider 112. The cloud gaming provider 112 may maintain and execute the video game being played by the user 100. The computer 106 transmits inputs from the HMD 102, the controller 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage network traffic. The connections to the network by the HMD 102, controller 104, and camera 108 may be wired or wireless. In some embodiments, content executed on the HMD 102 or displayable on a display 107, can be obtained from any content source 120. Example content sources can include, for instance, internet websites that provide downloadable content and/or streaming content. In some examples, the content can include any type of multimedia content, such as movies, games, static/dynamic content, pictures, social media content, social media websites, etc.

As will be described below in more detail, a player 100 may be playing a game on the HMD 102, where such content is immersive 3D interactive content. The content on the HMD 102, while the player is playing, can be shared to a display 107. In one embodiment, the content shared to the display 107 can allow other users proximate to the player 100 or remote to watch along with the user's play. In still further embodiments, another player viewing the game play of player 100 on the display 107 may participate interactively with player 100. For example, a user viewing the game play on the display 107 may control characters in the game scene, provide feedback, provide social interaction, and/or provide comments (via text, via voice, via actions, via gestures, etc.,) which enables users that are not wearing the HMD 102 to socially interact with player 100, the game play, or content being rendered in the HMD 102.

Figure 1B:
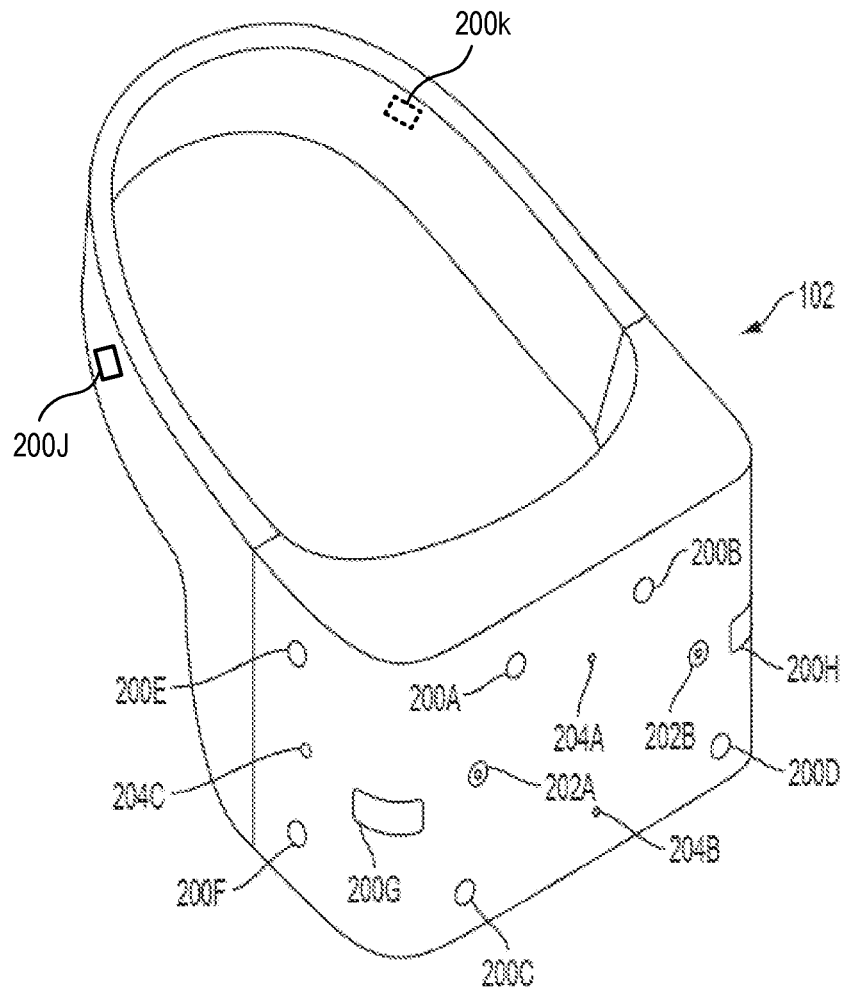
FIG. 1B illustrates a head-mounted display (HMD), in accordance with an embodiment of the invention.

FIG. 1B illustrates a head-mounted display (HMD), in accordance with an embodiment of the invention. As shown, the HMD 102 includes a plurality of lights 200A-H, J and K (e.g., where 200K and 200J are located toward the rear or backside of the HMD headband). Each of these lights may be configured to have specific shapes and/or positions, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102.

Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device. In some embodiments, inertial sensors are disposed in the HMD 102, which provide feedback regarding positioning, without the need for lights. In some embodiments, the lights and inertial sensors work together, to enable mixing and selection of position/motion data.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image captured devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102.

Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras or a single camera can be installed on the HMD 102, and oriented in any direction. For example, in another embodiment, there may be cameras mounted on the sides of the HMD 102 to provide additional panoramic image capture of the environment.

Figure 2:
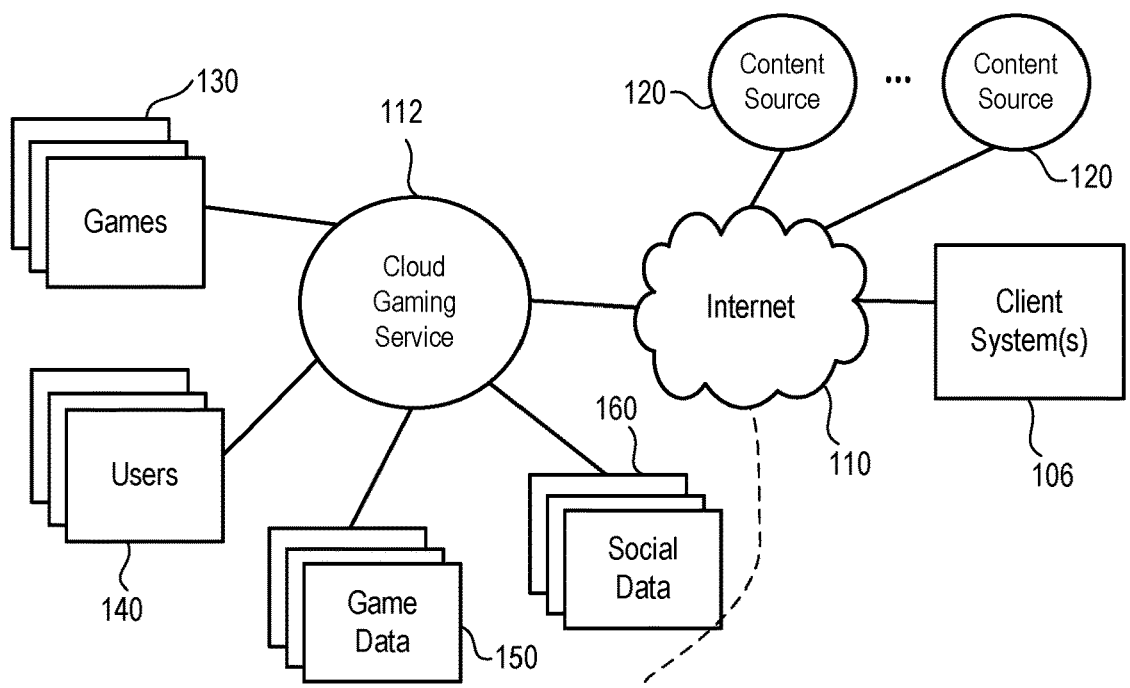
FIG. 2 illustrates one example of gameplay using the client system coupled to the HMD, in accordance with an embodiment of the invention.
Figure 2:
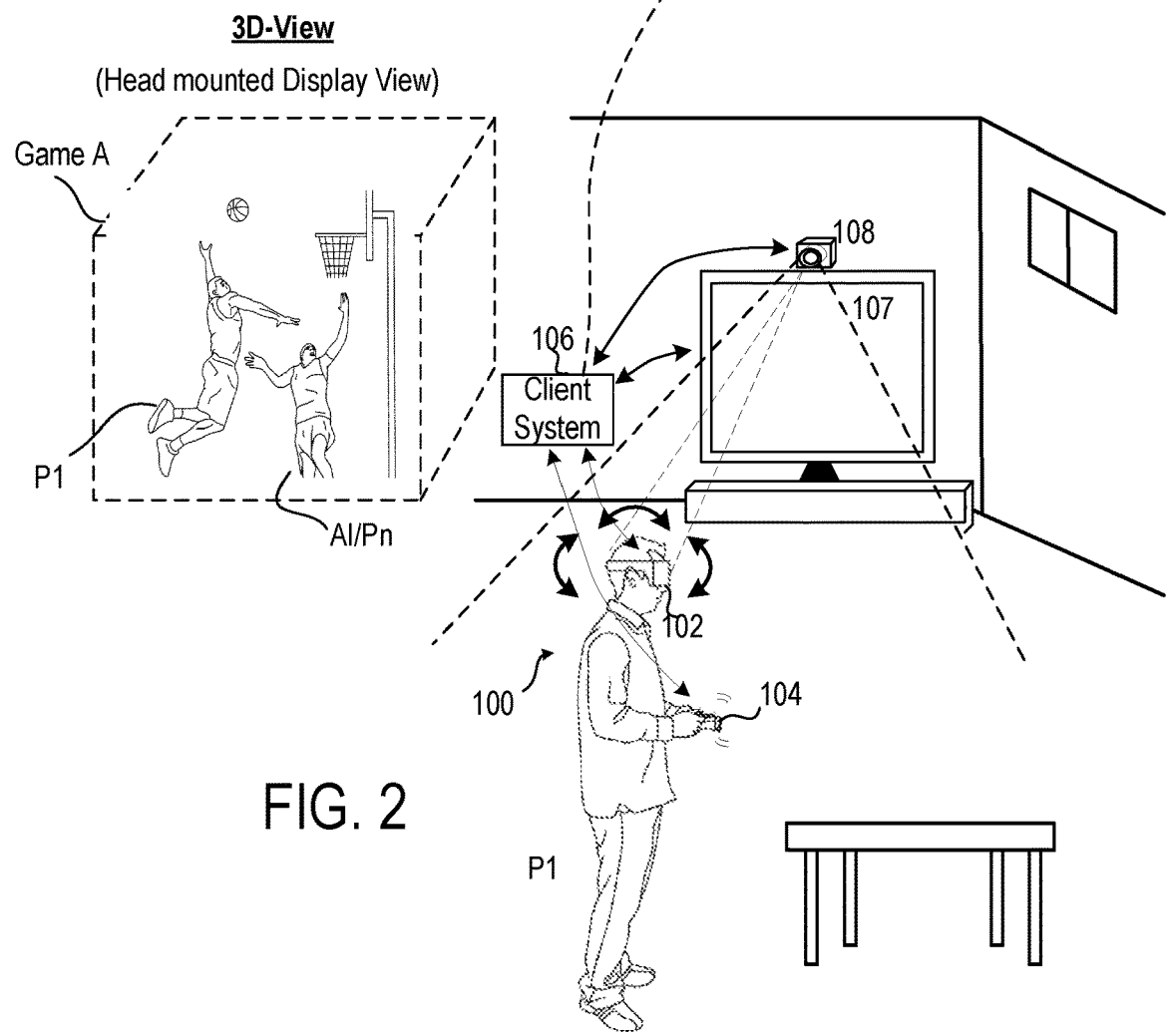

FIG. 2 illustrates one example of gameplay using the client system 106 that is capable of rendering the video game content to the HMD 102 of user 100. In this illustration, the game content provided to the HMD is in a rich interactive 3-D space. As discussed above, the game content can be downloaded to the client system 106 or can be executed in one embodiment by a cloud processing system. Cloud gaming service 112 can include a database of users 140, which are allowed to access particular games, share experiences with other friends, post comments, and manage their account information.

The cloud gaming service can also store game data 150 for specific users, which may be usable during gameplay, future gameplay, sharing to a social media network, or for storing trophies, awards, status, ranking, etc. Social data 160 can also be managed by cloud gaming service 112. The social data can be managed by a separate social media network, which can be interfaced with cloud gaming service 112 over the Internet 110. Over the Internet 110, any number of client systems 106 can be connected for access to the content and interaction with other users.

Continuing with the example of FIG. 2, the three-dimensional interactive scene viewed in the HMD can include gameplay, such as the characters illustrated in the 3-D view. One character, e.g. P1 can be controlled by the user 100 that is wearing the HMD 102. This example shows a basketball scene between two players, wherein the HMD user 100 is dunking a ball on another character in the 3-D view. The other character can be an AI (artificial intelligence) character of the game, or can be controlled by another player or players (Pn). User 100, who is wearing the HMD 102 is shown moving about in a space of use, wherein the HMD may move around based on the user's head movements and body positions. The camera 108 is shown positioned over a display screen in the room, however, for HMD use, the camera 108 can be placed in any location that can capture images of the HMD 102. As such, the user 102 is shown turned at about 90 degrees from the camera 108 and the display 107, as content rendered in the HMD 102 can be dependent on the direction that the HMD 102 is positioned, from the perspective of the camera 108. Of course, during HMD use, the user 100 will be moving about, turning his head, looking in various directions, as may be needed to take advantage of the dynamic virtual scenes rendered by the HMD.

Figure 3A:
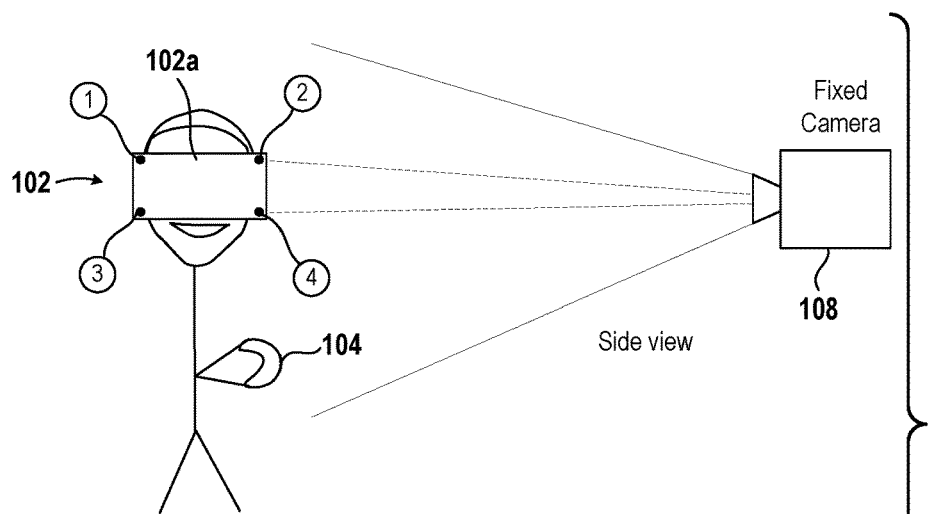
FIGS. 3A-3B illustrate an example of a user wearing an HMD where a camera sits at a fixed location, in accordance with an embodiment of the invention.
Figure 3A:
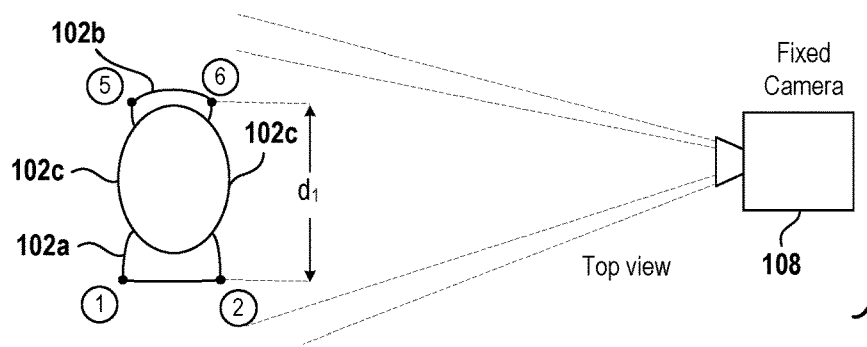

FIG. 3A illustrates an example of a user wearing an HMD 102, where a camera 108, set at a fixed location, is directed toward the user. In one embodiment, the camera 108 will have position that will enable viewing of the user, so that the HMD 102 and the controller 104 can be seen in the video frames captured. In one example, the controller 104 may include a marker, such as an LED light, which can be tracked at the same time the HMD 102 is tracked. In the side view, the camera 108 is capturing the side of the HMD 102. For purposes of illustration, the LED markers are numbered as markers 1, 2, 3, and 4, for those on the front unit 102a. The LED markers on the band adjustment unit 102b are not shown in the side view, but the top view shows that the camera 108 will be able to capture at least markers 2 and 4 from the front unit 102a and marker 6 from the band adjustment unit 102b. The separation between the front markers and the rear markers is, in one embodiment, estimated.

As described above, once the side view of FIG. 3A is detected in the captured video, based on analysis of the video frames, a calibration of an estimated distance d1 is performed. If calibration has not occurred yet for a present session of use, a calibration will be performed, wherein several video frames are analyzed and compared to actual motion data of the HMD, as obtained from HMD inertial sensors. The motion data in combination with the image data produces an estimation for the distance d1. In one embodiment, as discussed above, the HMD is associated with a geometric model, which is digital information as to where each of the markers are located and shapes.

Figure 3B:
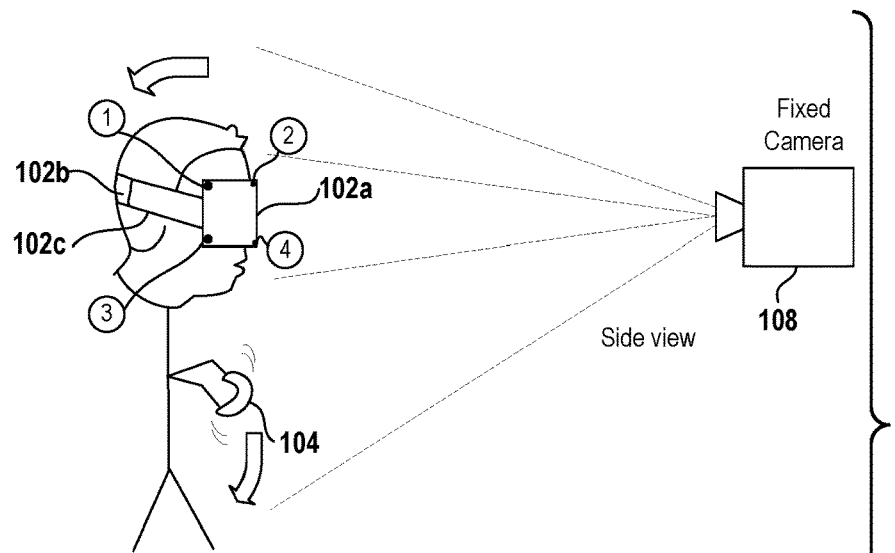
Figure 3B:
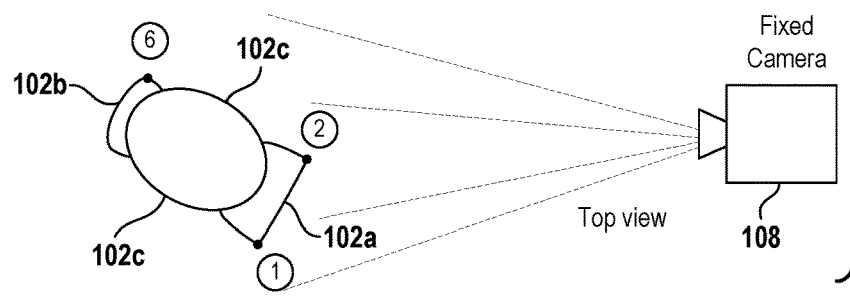

Using the calibration data, the geometric model is updated with the calculation of what the estimated separation d1 is, for the current session of use. As the user continues to pay or interact with the HMD 102, as shown in FIG. 3B, the distance data is utilized to track the movement and spatial positioning in space of the HMD and its tilts and angles relative to the camera 108. In FIG. 3B, for example, the illustration shows in the top view, that the user has turned his head back toward the camera 108. At such point in time, the camera may be able to see all of markers 1-6 on the front unit 102a. The separation d1, in this example, assumes that the user may have adjusted the headband 102c at some point, such that the HMD would fit snug on the user's head. A snug setting is preferred, as this avoids having the HMD 102 move on the user's face. Further, movement of the HMD 102 also, in one embodiment, changes the scene view point into the scene as viewed through the HMD 102.

If adjustments are made to the headband 102c, for example, the actual separation between the front markers and the rear markers will change, which may (depending on the amount of adjustment) cause a disconnect between where the markers are anticipated by the geometric model utilized by code of a game or program (e.g., library file(s)), and movements of the HMD 102 may not translate well to changes in the rendered scene in the HMD 102. For instance, movement of the HMD 102 while only the front markers (i.e., LEDs) 1-4 are being tracked will not change, as the geometric model of the HMD 102 stays static, as those markers are at fixed positions. However, when the camera moves between the front LEDs to the rear LEDs, if an adjustment in the headband occurred (to make it larger or smaller), the actual separation may not match to the geometric model or the calibrated geometric model. In such cases, the system can detect the need for calibration or recalibration if changes occurred during a session or some change or bend in the headband moves the actual separation.

FIGS. 3C-1, 3C-2 and 3C-3 illustrate an example of a user that is wearing an HMD 102 that is strapped to the user's head via a headband 102c, the headband is connected to the front unit 102a and the band adjustment unit 102b. In one embodiment, the band adjustment unit 102b includes an adjuster. The adjuster, in one example can be a rotary wheel that allows tightening (making the size smaller) or lessening (making the size larger) of the headband. Other adjusters are also possible, as no limitation should be made to the use an example rotary wheel.

Once the headband is adjusted, the user may start to use the HMD in a session. In this example, the user is facing the camera 108, as shown from the top view. While the user is interacting in the session, the camera is used to track the movement and positions of the HMD 102. As noted above, inertial sensors are also used during the tracking of the HMD 102, and the inertial data can be used to augment the optical tracking by the camera 108. Still further, the inertial sensors are used during calibration, wherein image data is analyzed in conjunction with the identified markers in the video images.

For example, the inertial sensors are generating position data, rotation data, and general movement data of the HMD 102, which in some embodiments is generated multiple times during the generation of one video frame. Because the generated inertial data is so rich and has a high degree of fidelity, it is possible to estimate a distance between identified image markers or objects over a period of several frames. As such, the calibration will produce an estimation of the actual distance between markers, e.g., between front and rear LEDs of the HMD 102. In the example captured frames 302, it is shown that the front of the front unit 102a of the HMD 102 is visible.

Figures 3, 3C:
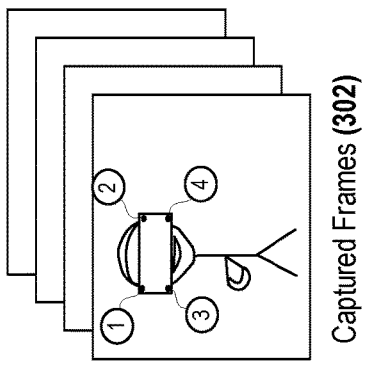
Figures 3, 3D:
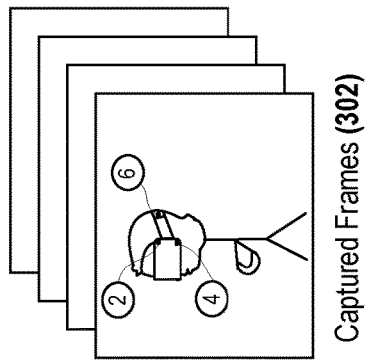
Figures 2, 3C:
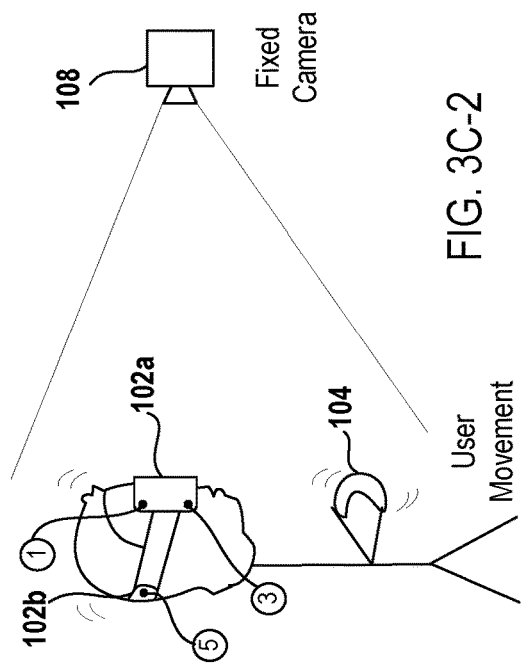
Figures 2, 3D:
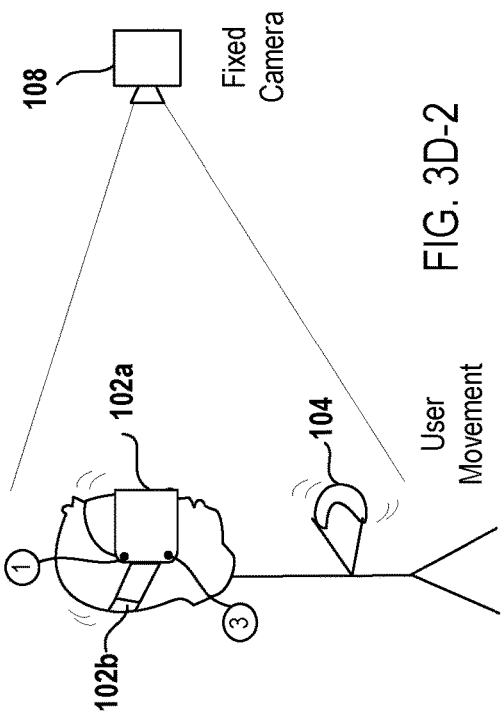

FIGS. 3D-1, 3D-2 and 3D-3 illustrate an example of where the user has rotated his head about 45 degrees away from the start position shown in FIG. 3C. It should be understood that rotation need not be perfect rotation, as a normal human movement of rotation can include movement of the face up and down (e.g., tilt), in combination with rotation. For purposes or example, simple rotation is shown, and it is assumed that other motion also occurred (e.g., tilts up/down at different points in time during the rotation). In action, the movement occurs over some period of time, which may happen (at any point in time) in response to the user wishing to explore a different scene in a game or view different content in a virtual space or view different scene regions within a movie or video. At one point in time, as shown in FIG. 3D-3, the captured frames 303 will include image data that includes markers 2, 4 and 6. For example purposes, suppose that this is the first time the rear marker 6 is captured in the frames, as the image data is analyzed. If calibration has not occurred for the current session, or it is determined that time has passed since the last calibration, the system will perform a calibration operation, wherein the distance between the front LEDs and the rear LED is calculated.

As discussed above, this is done by analyzing rotation data and positional data from the inertial sensors (e.g., gyroscope and accelerometer) of the HMD 102. This analysis will render an estimated separation distance, which is used for further tracking. In one embodiment, this initial estimated distance is saved to the geometric model of the HMD 102, which contains information regarding spatial separations and geometric shapes of the LEDs and other characteristics of the modeled HMD 102. In other embodiments, the calibration that includes the estimated distance is used until further examination indicates that a change has occurred (i.e., a new examination yields a different separation distance than the one used in the current calibrated geometric model).

This change may have occurred when the user adjusted the headband, or took off the HMD 102 and another user adjusted and tried on the HMD 102, or the headband 102 got bent or moved during the session. If the new estimated separation distance is beyond a predefined margin, the newly estimated separation distance is added to the calibrated geometric model. As mentioned above, the calibrated geometric model can be used by an application and/or the system to provide accurate tracking of the HMD 102 movements and positions and to provide content to the HMD 102 consistent with the direction, movement and motions made by the user wearing the HMD 102.

By maintaining the calibration of the geometric model updated to any identified change in distance or actual adjustment in the headband size, the content provided to the HMD 102 is prevented from seeing jumps, pops or inaccurate jitter when displayed in the HMD 102, especially when the user moves the HMD 102 to the side (i.e., away from substantially normal to the camera 108).

Figures 1, 3C:
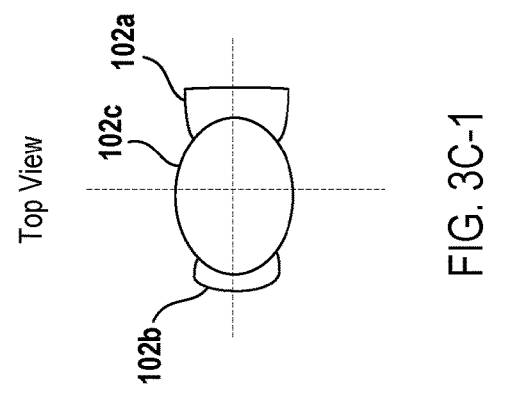
Figures 1, 3D:
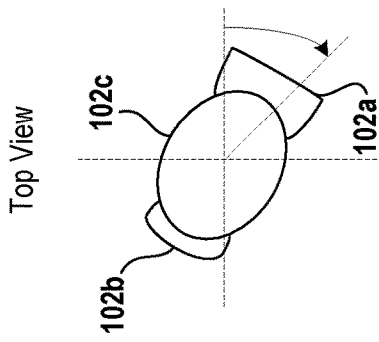

FIGS. 3E-1, 3E-2 and 3E-3 illustrate an example where the user has moved to about 90 degrees away from the position shown in FIGS. 3C-1 and 3C-2. At this point, if no adjustment has been made, and the calibration appears to be within margin (as compared to further background calibrations, but unapplied to the model), then the system will continue to use the estimated distance between the front and rear LEDs for rendering content to the HMD 102.

FIGS. 3F-1, 3F-2 and 3F-3 illustrate a time in the session where the user has rotated about 180 degrees from the position of FIG. 3E-1. In this example, the camera 108 is now producing captured frames 302 wherein markers 1, 3 and 5 are visible. As noted above, the original calibration of the separation distance may be used continually, until a next session, until the user stops moving and then resumes or when the user adjusts the headband. In still another embodiment, the system can again notice that the front and back LEDs are viewable, but also notice that it is the opposite side that is now viewable. In other words, the viewable LEDs of FIG. 3E-3 are the opposite side LEDs from those viewable in FIG. 3F-3.

Thus, the system can require that calibration be made for each side independently. Thus, although the side in FIG. 3E-3 was already calibrated and an estimated distance separation is being used in the geometric model, the system can independently run a calibration of the other side and estimate another separation distance that is added to the geometric model. In this manner, separate calibrations for both sides can cure situations where an adjustment is made to one side of the headband and not the other side of the headband, or if a kink in the headband produces different actual separations between the rear LED and the front visible LEDs.

FIGS. 3G-1, 3G-2 and 3G-3 illustrate an example where the back of the HMD 102 is visible in the captured frames 302. In this example, the tracking of the LEDs 5 and 6 can occur using the original geometric model of the HMD 102, as the LEDs 5 and 6 are on a fixed structure that does not change. In other embodiments, if the back LEDs were not fixed relative to each other, it is also possible to calibrate the one of the rear LEDs to the front LEDs and then the calibrated back LED to the other LED, as the user's head rotates around at different times.

Figure 4A:
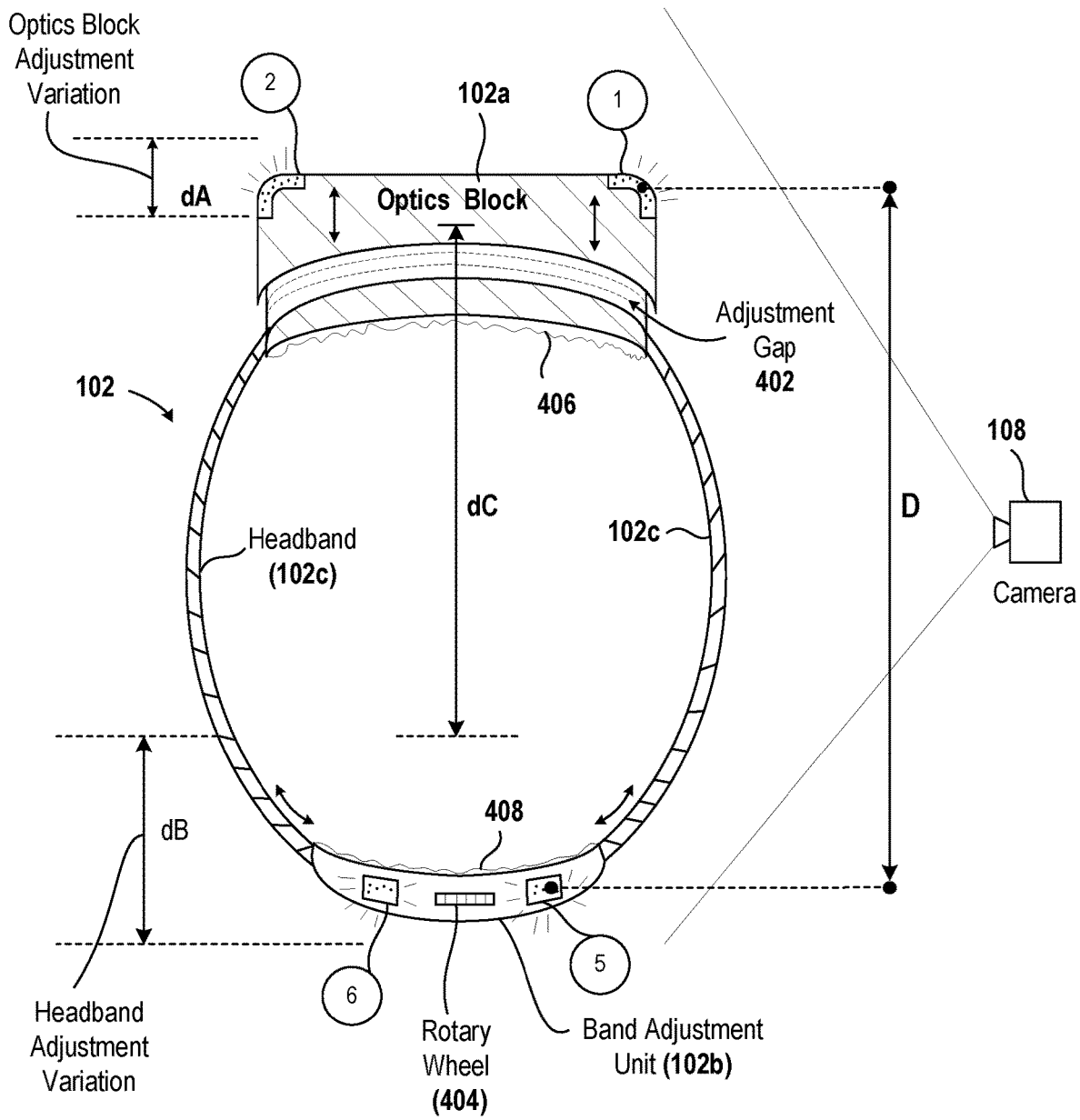
FIG. 4A illustrates a top view of the HMD, and a camera which is positioned to be able to identify markers (e.g., LEDs) associated with the HMD, in accordance with an embodiment of the invention.

FIG. 4A illustrates a top view of the HMD 102, and a camera 108 which is positioned to be able to identify markers (LEDs) associated with the HMD 102. The HMD 102 top view shows the front unit 102a and the band adjustment unit 102b connected by way of the headband 102c. The front unit 102a includes the optics block section of the HMD 102. The optics block is configured to be adjustable by an adjustment gap 402. As such, the optics block can move toward and away the face of the user when attached to a user's head. In one embodiment, the adjustment gap 402 is made adjustable for comfort of the HMD 102 user and also to provide additional space between the user's eyes and structure in the optics block. The additional space can be utilized to accommodate eyeglasses of the user. As shown, the band adjustment unit 102b includes a rotary wheel 404, which is usable to adjust the headband in a manner that either contracts into the band adjustment unit 102b or expand out of the band adjustment unit 102b.

As noted above, other adjusters are also possible, as no limitation should be made to the use an example rotary wheel. For instance, other adjusters can include belt adjusters, notched adjusters, pin and holes adjusters on a band, snap-in or snap together adjusters, Velcro adjusters, tape adjusters, belt and buckle adjusters, rope adjusters, link connector adjusters, elastic adjusters, or combinations of various types of adjusters and clips and locks.

Adjustments are made to provide for a snug or comfortable fit by a user who has placed the HMD on his or her head. Because of this adjustability, the actual separation distance D of the HMD 102 from front to back will vary, based on the adjustments made. For illustration purposes, if the optics block were pushed toward the users face completely and the rotary wheel 404 was adjusted to bring the size of the headband to its smallest possible size, the separation distance would be dC. However, given that customize adjustments by the users, a variation of separation dA will be present for adjustments in the optics block, and also for adjustments in the band adjustment unit 102b by separation dB. At any one time, the actual physical separation D between the LEDs in the front unit of the optics block and the rear LEDs in the band adjustment unit 102b will vary, and for this reason calibration is performed as described above to identify an estimated separation distance between the front LED and the rear LED, based on the current adjustments.

As illustrated, the separation distance is equal to: D=dC+/−dA+/−dB. The calibration during use of the HMD will therefore identify a close approximation estimate of the actual separation between the visible rear LED and the visible front LEDs, therefore defining the separation distance. The separation distance is then added to the geometric model of the HMD 102, which is utilized to render content to the HMD based on the position, rotation, movement and orientation of the HMD during use.

Figure 4B:
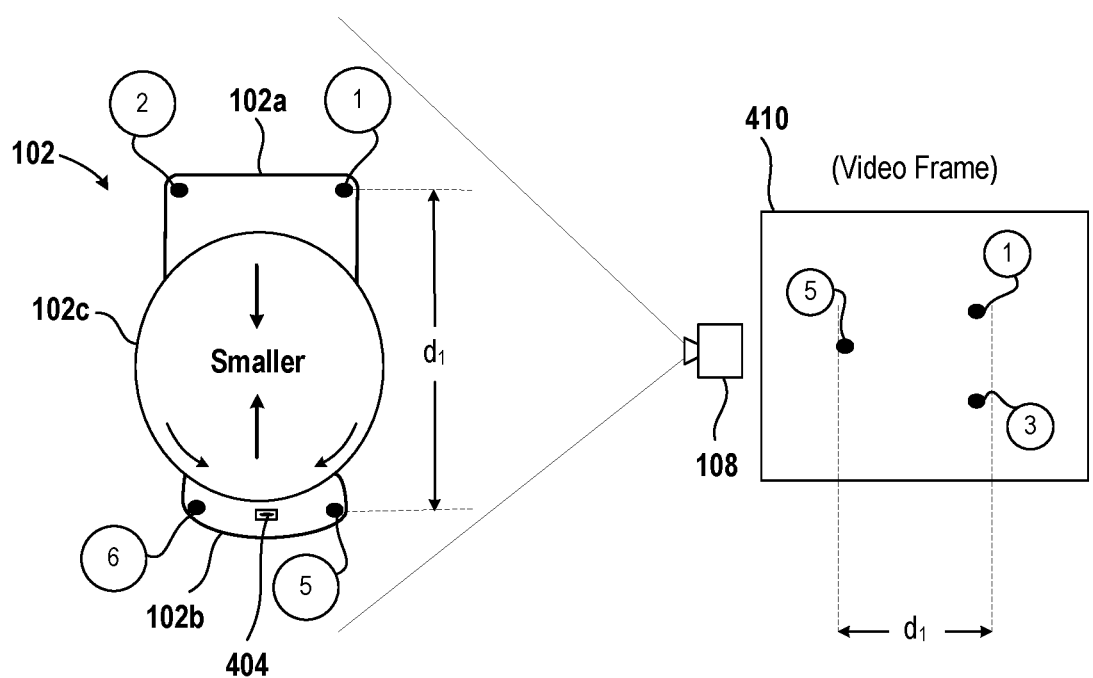
FIGS. 4B-4C illustrate examples of a top view of an HMD where a separation is physically adjusted and associated processing, in accordance with an embodiment of the invention.

FIG. 4B illustrates an example of a top view of an HMD 102 where a separation d1 is physically set for the physical HMD. The physical setting can occur due to adjustments made to the headband 102c of the HMD. The video frame 410, when analyzed will show that a separation distance d1 is estimated, based on analysis of multiple frames and simultaneous analysis of the inertial data produced by sensors in the HMD 102.

Figure 4C:
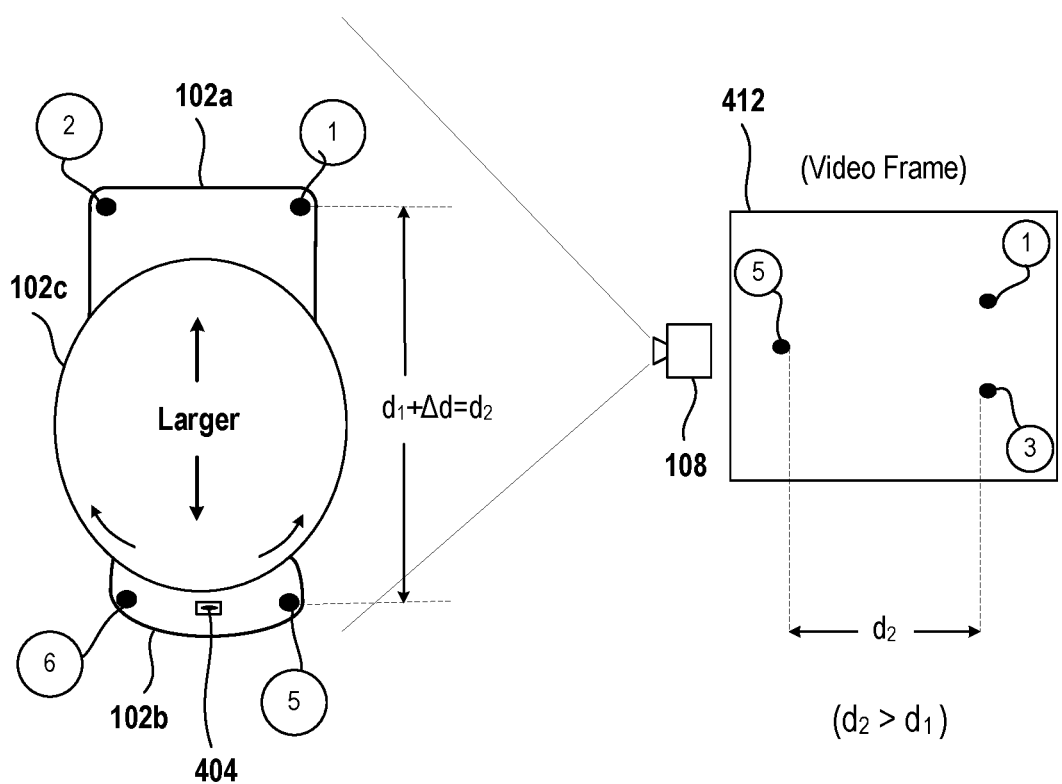

In comparison, FIG. 4C illustrates a top view of the HMD 102 after an adjustment is made to make a larger headband 102c. This process will also include analysis of the captured video frames to identify the current positions of the rear and front LEDs, and then run through a calibration operation to determine if the resulting estimated separation is the same as previously calibrated for the size of FIG. 4B. In one embodiment, the system will determine that the size is now larger by a Δd, in other words d1+Δd, which is now d2. If the difference Δd is greater than a margin of air acceptable to the system, the original calibration will be maintained.

If the new estimated distance d2 is different than estimated distance d1, then the calibration data in geometric model is updated to include the distance d2. In another embodiment, instead of relying on an additional calibration step to identify whether a new calibration is producing an estimated distance larger than the original estimated distance, an adjustment of the rotary wheel 404 or any other adjustment mechanism can trigger a signal, such as a flag or data indicative of a change to the size of the headband 102c.

As a result, this signal can be communicated back to the system which would then enforce that a new calibration be performed to identify a new estimated separation between a front LED and a rear LED. In still other embodiments, recalibration can be performed when the system determines that inactivity or non-movement of the HMD has occurred for some time. This would be an indicative signal that new calibration data for the distance between the front LED and the rear LED is necessary, as it is highly likely that a new user has put the HMD 102 on to begin a new session or to participate in an existing session.

For instance, during the session enjoyed by a first player, a nearby second player may wish to view the content being rendered in the HMD and the first player can or may remove the HMD so the second player can view the content for a small period of time. During this sharing, it is possible that the HMD headband may have been adjusted. In fact, it is possible that to adjustments occurred: a first adjustment for the second player to temporarily wear the HMD, and a second adjustment so that the first player can resume the session after obtaining the HMD back from the second player.

Figure 4D:
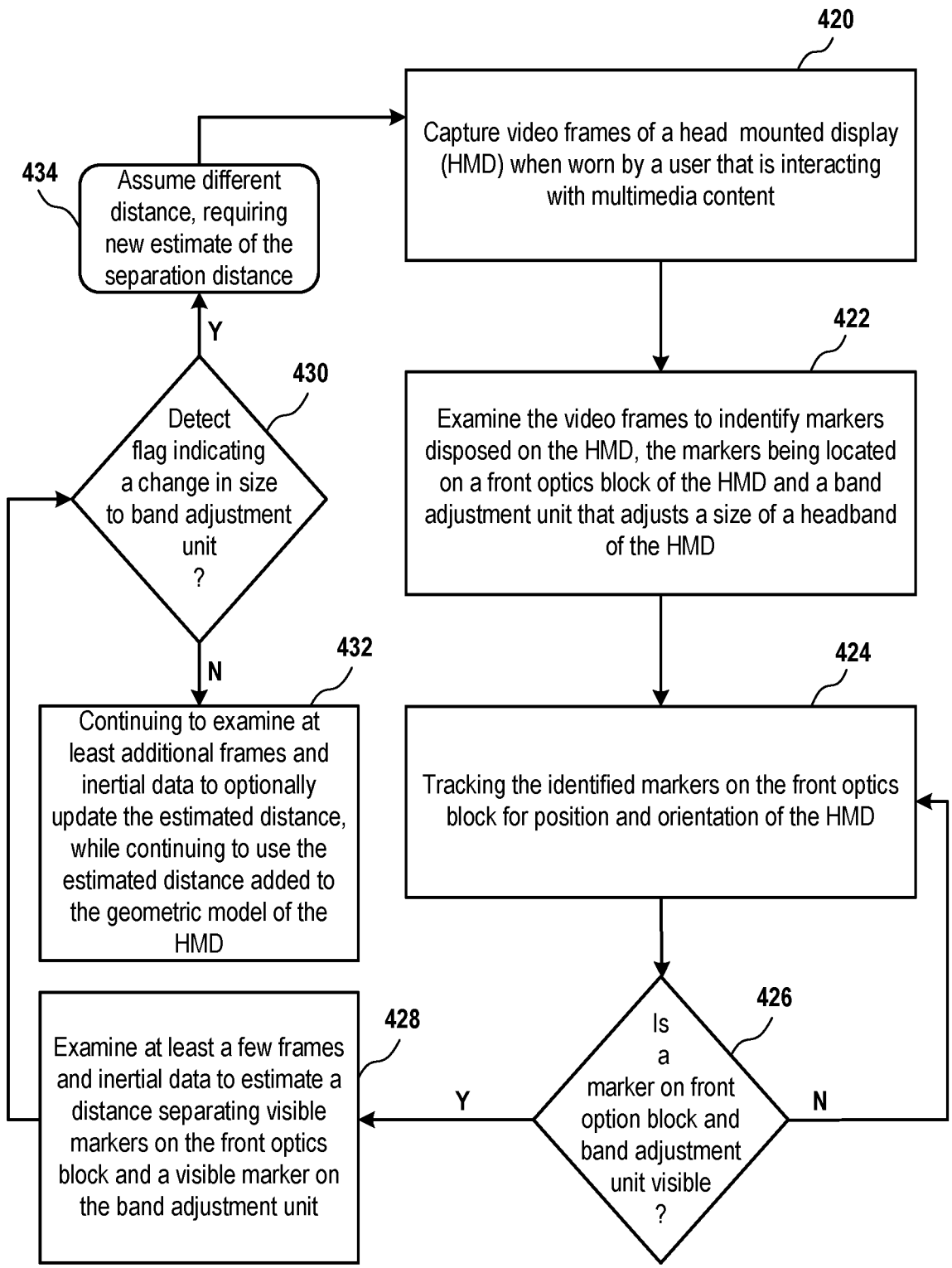
FIG. 4D provides an example flow diagram of operations that can be performed to identify the separation distance between the front markers on the HMD and the visible rear marker associated with the headband of the HMD, in accordance with an embodiment of the invention.

FIG. 4D provides an example flow diagram of operations that can be performed to identify the separation distance between the front markers on the HMD and the visible rear marker associated with the headband of the HMD. In operation 420 includes capturing video frames of a head mounted display when worn by a user who is interacting with multimedia content. The multimedia content, as described above can include various types of media. The types of media can include video games, movies, web content, video clips, audio content, combinations of video and audio, video conferencing, social media interactive communications, and/or combinations thereof.

During the time when the user is interacting with the multimedia while wearing the HMD, content is being provided to the HMD for rendering and viewing by the user. In one embodiment, a camera is also provided to view the position and orientations and movements of the HMD. The camera, in one embodiment produces multiple images in the form of video frames. The video frames can then be examined to identify markers disposed on the HMD, in operation 422. The markers, as mentioned above, can include LEDs.

In other embodiments, the markers can include markings that do not illuminate, shapes, retro reflective surfaces, different color surfaces, different color regions or surfaces, combinations of LEDs and surfaces, combinations of LEDs, retro reflective tapes, reflective paints, reflective surfaces, numerical data, QR code data, patterns, images, and combinations of two or more thereof. As such, although one embodiment utilizes LEDs that light up a region of the HMD with a color, that color can vary and the shape and orientation of the LED surface or region that is illuminated can also vary. In some embodiments, multiple different colors can be used by the HMD, such that certain colors identify positions. In yet other implementations, different colors can be utilized on different parts of the HMD or on different HMD's when multiple HMD's are being tracked. If multiple HMD users are being tracked, different colors can be assigned to different players. The LEDs can also be configured to illuminate in patterns, intermittently, or pulsate to communicate codes or data by way of the image data captured and analyzed by the system.

In some embodiments, the LEDs can be configured to change in illumination intensity. The change in illumination can be dynamically controlled, such as in response to detecting environmental lighting. If the lighting in a room is bright, the illumination can be intensified or different colors can be selected to improve or enhance tracking. In some other embodiments, the colors selected can be ones that are different or provide more contrast to surrounding colors of a room, environment, the person's clothes, or combinations thereof.

In operation 424, the identified markers can be tracked by analyzing the image data captured by the camera. Tracking of the HMD is facilitated by the markers identified on the front optics block, which are oriented in an arrangement that enables identification of position and orientation of the front optics block of the HMD. In the illustrated example, the markers are positioned at the front corners of a substantially rectangular optics block, when viewed directly on from the camera 108. Thus, when the user moves his head down, the two upper LEDs and the two bottom LEDs appear to become closer in the images captured by the system, upon analyzing the image data in the video frames. Similar processing can be made to determine when the user is turning to the left, turning to the right, tilting to the left, tilting to the right, or combinations of movements such as rotations and tilting. In one embodiment, operation 426 determines if a marker on the band adjustment unit is visible in the captured video frames.

As noted above, the band adjustment unit is disposed substantially toward the back of the users head when the HMD is used and worn. As such, the marker on the band adjustment unit will be visible at a point in time when at least two of the front markers are also visible. At this point, a calibration operation can occur to identify the distance between the front LEDs and the rear LEDs in operation 428. In this operation, at least one of the frames are examined and inertial data is examined to estimate a distance separating the visible markers on the front optics block and a visible marker on the band adjustment unit. As noted above, multiple frames can be analyzed to identify movement of the HMD and changes in the movement in the image data, which are mapped together to identify an estimated separation distance.

In one embodiment, inertial data, which can include gyroscope data and accelerometer data, is associated to different points in time at which the various frames show movement of the LEDs, relative to other frames. In some implementations, utilized gyroscopes can provide samples at a rate that is many times per frame, which is a rich set of data that allows for very accurate estimation of the amount of movement occurring between the front and rear LEDs, which enable an accurate estimation of the separation distance. In some embodiments, the accelerometer can provide samples at a rate of up to about 2000 frames per second, and this information is also usable to identify the position and rotation of the HMD.

In one embodiment, operation 430 is processed to determine if a flag has been detected, which indicates a change in size to the band adjustment unit. For example, a circuit in the band adjustment unit can trigger a signal, a flag, or communicate data indicative of a change and/or an amount of change made to the headband. If the flag has not been detected, the operation moves to 432 where the HMD use can continue to examine additional frames and inertial data to determine if an update is necessary to the estimated distance, while keeping the estimated separation distance in place and associated with the geometric model of the HMD. If it is detected that a flag has been set in operation 430, the method moves to operation 434 were it is assumed that a different distance in the headband has been set, which will require a new estimate of the separation distance. Once the new separation distance is estimated, the new separation distance is added to the three-dimensional model of the HMD 102, which is then used during the session, now session, or for further use of the HMD.

Figure 4E:
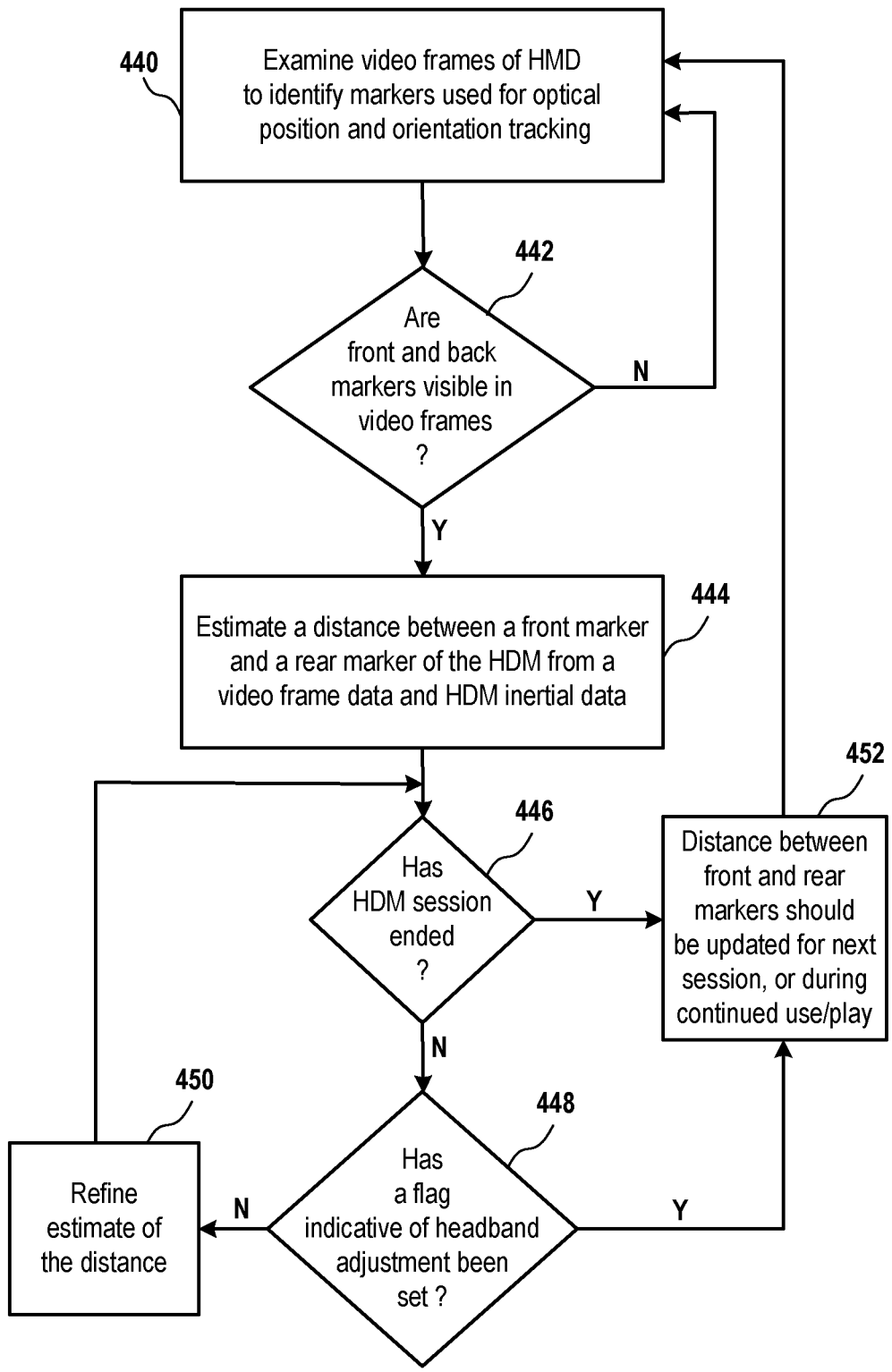
FIG. 4E illustrates another flow diagram example, utilized to make calibrations to the separation distance between LEDs of the front unit of the HMD and an LED associated with a rear portion of the HMD, in accordance with an embodiment of the invention.

FIG. 4E illustrates another flow diagram example, utilized to make calibrations to the separation distance between LEDs of the front unit of the HMD 102 and an LED associated with a rear portion of the HMD. In this example, video frames of the HMD are examined to identify markers used for optical position and orientation tracking in operation 440. In operation 442 it is determined if the front and back markers are visible in the video frames. If they are not visible, the method continues to identify and use the markers on the front unit of the HMD for tracking, as the markers on the front unit do not change in separation due to their fixed orientation on the front unit. Because they are fixed on the front unit, the geometric model of the HMD is consistent with the known separation on the front unit of the HMD.

In operation 444, once the front and back markers are visible in at least one frame, the operation performs an estimate of the distance between the front marker and the rear marker of the HMD from the video frame data and HMD inertial data. The estimate of the separation is made by examining video frame data and correlating it to inertial data for when the user moves his or her head, thus moving the location of the visible LEDs at a particular rate, orientation, and distance. Once the estimated distances are determined, that estimated distance separation is added to the original geometric model of the HMD.

By adding the estimated distance to the model, the model has now been calibrated to the estimated separation distance between the front visible and rear visible markers. In operation 446, it is determined if the session has ended. It can be determined that the session has ended when the HMD does not move for a period of time, the HMD is placed on the surface and has not moved for some time, the HMD is no longer shown moving with the user, who may be detected in the image data, a sensor indicator generates a flag indicating the end of the session, the game code has ended interactivity with the game, the user has turned off the unit, the user has placed the unit in sleep mode, or the user is interacting with display data or navigating screens or settings that do not require motion tracking of the HMD, etc. Accordingly, when the session has ended, it is determined that the distance between the front and rear markers must be updated for the next user or next session.

If the session has not ended as determined by operation 446, a determination is made in operation 448 to determine if a flag has been set indicative of the headband being adjusted. If the headband has been adjusted and a flag is set, the system will request that the distance between the front and rear markers should be updated for a next session or continued play or use. If the flag is not set in operation 448, the system can proceed to refine the estimated distance during use. As noted above, this can occur periodically or every time the user exposes the side of the HMD to the camera after only exposing the front LEDs to the camera.

In some embodiments, the estimated distance can be calculated, but the calibration is not automatically updated to the geometric model. In this example, calibration can continue to occur continuously until one of the calibrations identifies an estimated distance that is substantially different or beyond the margin allowable, so that the new calibrated estimated distance should be added to the geometric model for continued use.

In one embodiment, it has been determined that a change in the estimated separation distance up to about 50 mm is within the margin (or up to about 30 mm is within the margin, or up to about 20 mm is within the margin, or up to about 15 mm is within the margin, or up to about 10 mm is within the margin, or is up to about 5 mm is within margin), and will not adversely affect the tracking and the delivery of multimedia content to the HMD. In some embodiments, if the estimated separation distance has changed by more than about some predefined mm value (e.g., 1 mm, 2 mm, 3 mm, 4 mm, 5 mm, 6 mm, 7 mm, 8 mm, 9 mm, 10 mm, 15 mm, 20 mm, etc.), then a new estimated separation distance should be added to the geometric model, to avoid inconsistencies in the track positions versus the position that the software and system expects the HMD to be in. When such inconsistencies occur, it is possible that the images or content rendered on the HMD can show a glitch, a pop, or some sort of jump that is not normal. If the difference in the estimated separation distance is minimal, less than a predefined mm value (e.g., 1 mm, 2 mm, 3 mm, 4 mm, 5 mm, 6 mm, 7 mm, 8 mm, 9 mm, 10 mm, 15 mm, 20 mm, etc.), then it is determined that no update to the geometric model is necessary as the images will render without noticeable loss of quality.

In some embodiments, the margin or amount by which the separation distance changes can vary depending on the content being displayed in the HMD 102. If the content requires more precision, such as in complex or very rich graphically intensive games, the margin may be lower. If the content is Web data, webpages, or other content that does not change often or is substantially fixed or less interactive, the margin can be larger.

Figure 4F:
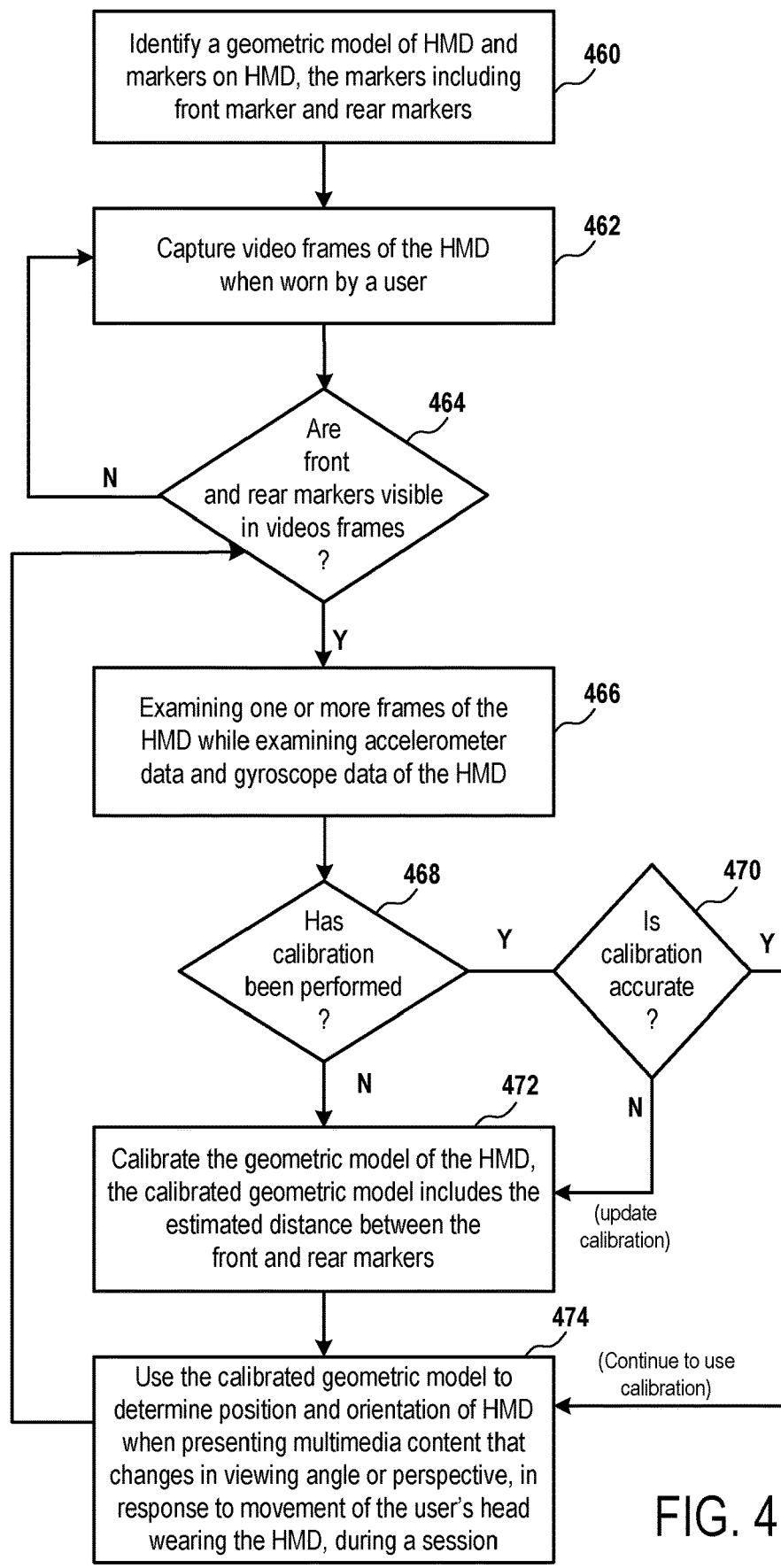
FIG. 4F illustrates yet another embodiment, wherein examination of video frames and inertial data is performed to identify separation distances between the front and rear markers of the HMD, in accordance with an embodiment of the invention.

FIG. 4F illustrates yet another embodiment, wherein examination of video frames and inertial data is performed to identify separation distances between the front and rear markers of the HMD. In this example, operation 460 identifies a geometric model of the HMD and markers on the HMD. The markers on the HMD include front markers and rear markers. As mentioned above, the front markers are fixed at a set orientation relative to the front unit of the HMD. The rear markers are coupled to a headband, which is adjustable. Therefore, by adjusting the headband, the rear markers will be adjusted further or closer to the markers of the front unit of the HMD.

The separation distance between the two must be estimated, so that the distance can be calibrated to the geometric model of the HMD. In operation 462, video frames are captured of the HMD when worn by the user. In operation 464, it is determined if the front and rear markers are visible in video frames captured of the HMD during a session or during use. If they are not visible, the method continues to capture video frames of the HMD in operation 462, utilizing position and orientation information from the markers disposed on the front unit of the HMD, for which the separation distances and relative orientations and shapes are geometrically known.

In operation 466, it is determined that one or more frames of the HMD must be examined while examining accelerometer data and gyroscope data from the HMD. The one or more frames of the HMD captured by the camera will then be associated to the accelerometer data and gyroscope data. By analyzing successive frames and associated image frames in conjunction with the inertial data, a separation distance is estimated between the front markers and the rear marker that is visible in the image frames. In operation 468, it is determined if calibration has been performed. If calibration has not yet been performed the method moves to operation 472. In operation 472, the geometric model of the HMD is calibrated.

As such, the geometric model will include the estimated distance between the front and rear markers, as determined in operation 466. If it is determined that calibration has occurred in the past, the method moves from operation 468 to operation 470. In operation 470 it is determined if the calibration is accurate. As noted above, the calibration may become in accurate if an adjustment to the headband has been made, a kink in the headband has been introduced, or the HMD has been shared with another user who has adjusted the headband or manipulated that HMD to produce a different estimated separation.

If the different estimated separation has been determined by examining again the video frames when the front and rear markers are visible, and comparing them to the inertial data, and the new estimated separation distance is greater than an allowed margin, the calibration is updated in operation 472. If the calibration remains accurate, or is within the margin, then the calibrated geometric model of the HMD will continue to be used with the originally determined separation distance between the front and rear markers.

Therefore, the calibrated geometric model will continue to be used to determine the position and orientation of the HMD when tracked and when presenting multimedia content which changes at least by movement and/or position of the HMD by the user. As noted above, the method can continue to perform calibrations that are not added to the geometric model, but are used to determine when the separation distance needs to be updated in response to some change or adjustment to the headband of the HMD.

Figure 5A:
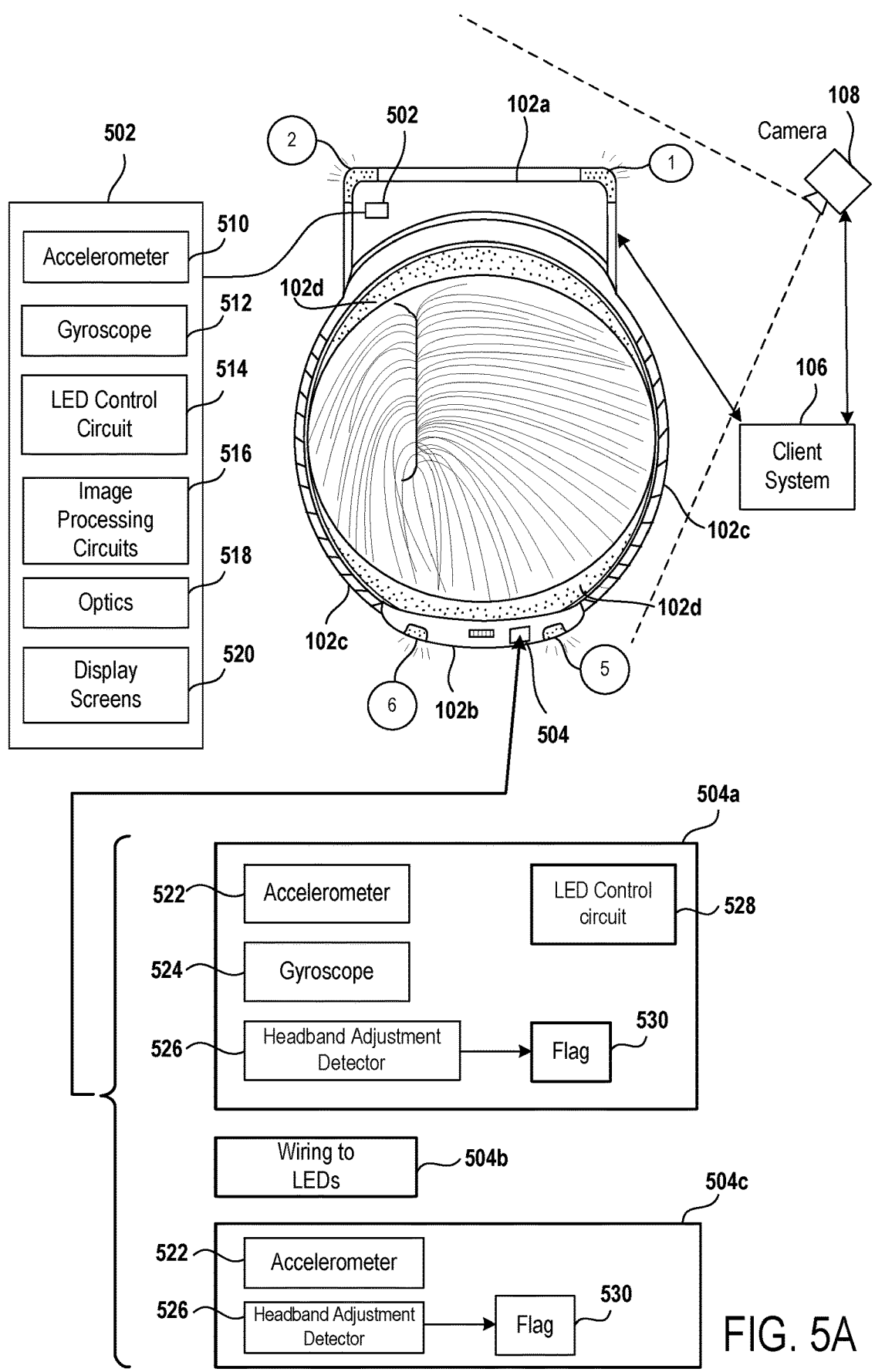
FIG. 5A provides an example of a top view of the HMD, in accordance with one embodiment of the present invention.
Figure 5B:
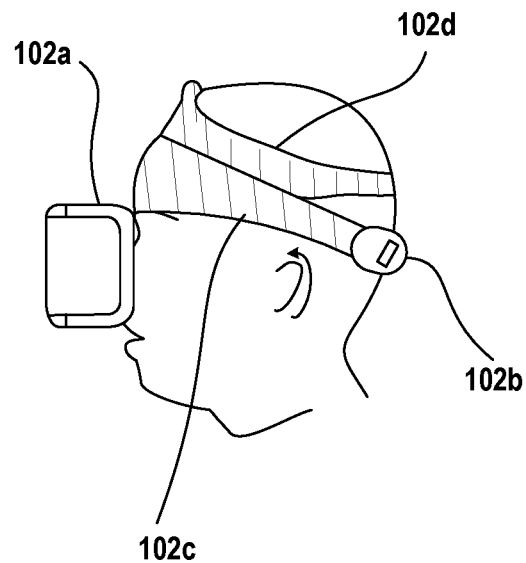
FIGS. 5B and 5C illustrate examples and processing for when inertial sensors are added to the rear section (i.e., in addition to just having inertial sensors in the front unit), in accordance with one embodiment of the present invention.

FIG. 5A provides an example of a top view of the HMD 102, in accordance with one embodiment of the present invention. In this example, it is shown that the optics block associated with the front unit 102a of the HMD includes various components. Without reciting all of the components contained within the optics block, some components that are useful for tracking and determining the estimated separation distance between the front and rear LEDs are shown, by way of example.

In block 502, example components can include an accelerometer 510, a gyroscope 512, and LED control circuit 514, an image processing circuit 516, optics 518, display screens 520, and other components and circuitry used for rendering content to the HMD, when communication is made with a client system 106. As mentioned above, the HMD can be communicating directly with a client system 106 locally, and the connection can be made by way of a wire or wireless connection. In one embodiment, the HMD includes a circuit for communicating with the HMD. The circuit can be for transmitting and receiving signals and/or data to and from the computing system. The circuit, in a wireless configuration, can include a wireless communication link. The circuit, in a wired configuration, can include cable connectors and interfaces for enabling plugging, connecting, extending and/or interfacing between the HMD and the computing system.

In some implementations, the user of the HMD 102 can also be interacting with the content rendered in the HMD using a controller 104 or another input technology. In another embodiment, the HMD 102 can include circuitry for communicating directly with a router or networking components that allow communication with a cloud infrastructure.

As is further shown, the HMD 102 can include an additional headband, which is defined by a headband portion 102d. The additional headband can include padding, and can be adjusted separately from the headband 102c. The top view of the HMD 102 is provided with the illustration of a user's head which has the HMD positioned thereon. Further illustrated is optional components 504, which may be integrated or contained within the band adjustment unit 102b. The components can include, in some implementations, components shown in block 504a.

Block 504 80 includes an accelerometer 522, a gyroscope 524, a headband adjustment detector 526 that is configured to generate a flag 530. The flag 530, in one embodiment, is set when a detection is made that an adjustment was made to the headband, such as by adjusting the rotary wheel 404. In another embodiment, block 504b can be disposed within the band adjustment unit 102b. In this example the band adjustment unit 102b includes no circuitry, but simple wiring that connects the circuitry disposed in the optics block (502) to the LEDs 5 and 6.

In still another embodiment, block 504c can include an accelerometer 522 and optionally a headband adjustment detector 526, which is utilized to generate the flag 530. Accordingly, it should be understood that the rear section of the headband, which is referred to herein as the band adjustment unit 102b can include no circuitry, or can include additional circuitry to allow further determinations of position by virtue of output from the inertial sensors.

Figure 5C:
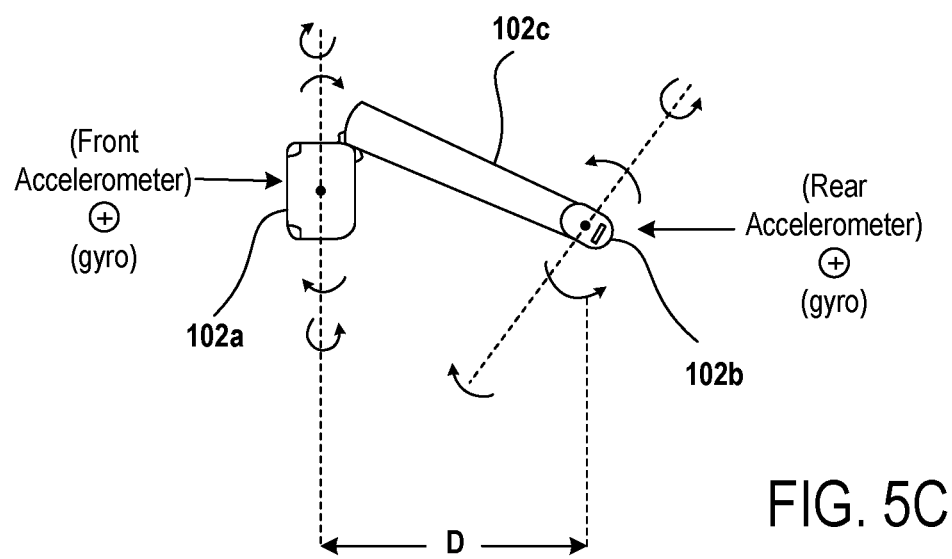

FIG. 5C illustrates an example of a side view of the user wearing HMD 102, wherein the front unit 102a is disposed over the face and eyes of the user while being connected to the headband 102c and the band adjustment unit 102b. FIG. 5C illustrates a side view of the HMD 102 to show the relative positioning of the optics block that includes the front unit 102a and the positioning of the band adjustment unit 102b, which is connected to the headband 102c.

As shown, when the HMD 102 is positioned over a users head, the positioning of the optics block and the band adjustment unit 102b will have a substantially known relative orientation. If the band adjustment unit 102b is configured to include a rear accelerometer and a gyroscope, data can be collected from both the rear of the HMD and the front of the HMD, which already includes a front accelerometer and a gyroscope. In one embodiment, data obtained from the inertial sensors from the front of the HMD and from the rear HMD can be plotted to determine a relative positioning of the components, such as relative to a center point of the HMD (e.g. an approximate center of where the users head would reside).

For example, the front accelerometer and the rear accelerometer can generate data regarding the rotational forces and angles of rotation relative to a gravitational force. In a substantially normal or resting position, the optics block will be substantially parallel to the gravitational forces determined by the front accelerometer. In the same position, the rear accelerometer may experience an angle of rotation relative to the gravitational forces. The position and vocational data received from the front and rear accelerometers can therefore be mapped or monitored to determine when an adjustment in the headband has been made, which would require recalibration of a separation distance between the front LEDs and the rear LED. In another embodiment, by examining the relative inertial data between the front and the rear LEDs, the separation distance is estimated by simply using the inertial data of the front and rear sections of the HMD, without having to rely on examination of the video frames captured by the camera.

Thus, it is possible to examine the pitch and the tilt between the front and rear accelerometer data to identify an approximate center point separation between the front and rear sections of the HMD. Adjustments of the headband would therefore change the distances to the center, which would then signal a need to adjust the estimated separation distance in the geometric model of the HMD, to allow accurate tracking of the HMD during use. Furthermore, by including a gyroscope in the front and in the back, errors in gyroscope data can be reduced, whereby differences can be canceled out or refined over time.

Therefore, in some implementations, if there is an accelerometer inside the rear headband, it is possible to determine the tilt of the rear vs. the front. This could signal, for example, that there may be a flex in the band. This information can then be communicated to the user by way of a recommendation, e.g., such as by a message in the screen of the HMD.

Still further, with the front and rear accelerometers, plus a gyro, it is possible to estimate the distance the headband is away from the front accelerometer. This is possible because the back accelerometer will experience a larger centripetal acceleration (e.g., since it is traveling on a longer "arm" than the front one). And, because you know how fast the HMD is rotating (e.g., with a gyro) it is possible to determine or estimate how far away the accelerometers are away from each other. This information can be used to determine an estimated separation distance, which can then be added as calibration to the geometric model of the HMD 102, and which is used for tracking during rendering of content.

Furthermore, since both an accelerometer and gyro are disposed on the rear headband, it is possible to run two independent tracking "devices", and average out the results, or perform additional estimation or blending. In one embodiment, this estimated separation between the front and rear LEDs would be the difference between the LEDs. In further embodiments, if both sides of the HMD are estimated for separation between the front and rear LEDs (e.g., independently), it is possible to blend or fuse together the results to arrive at a more optimal estimated separation distance for use on both sides of the geometric model.

Figure 6A:
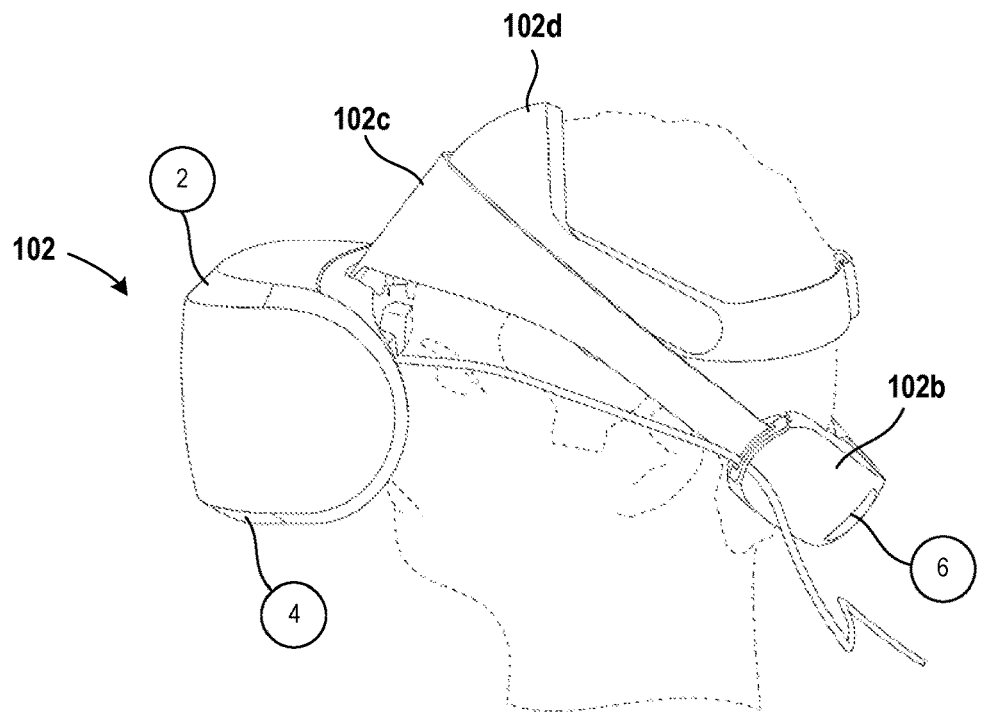
FIGS. 6A-6C illustrate various views of the HMD, when worn on a head of a human user, in accordance with one embodiment.
Figures 6B, 6C:
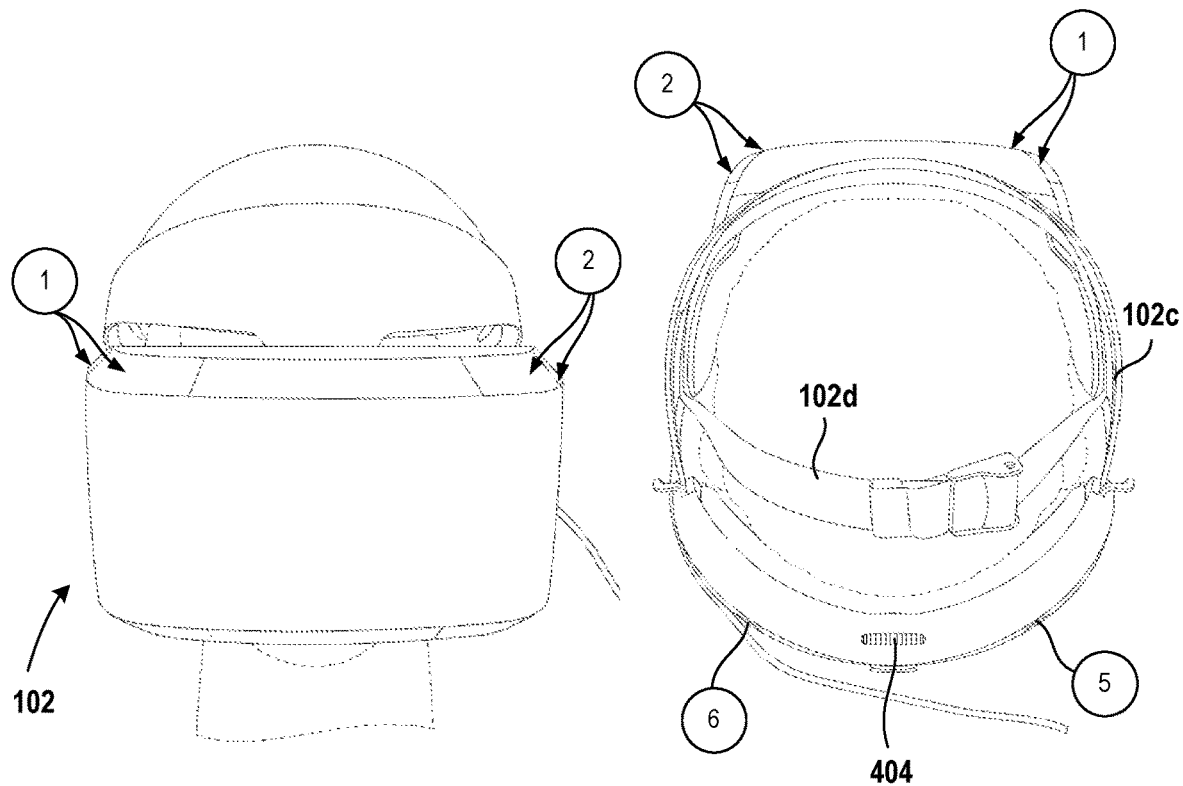

FIGS. 6A-6C illustrate various views of the HMD 102, when worn on a head of a human user, in accordance with one embodiment. In FIG. 6a, it is shown that LED 2 can wrap around the front face and side face of the HMD 102. The same can occur for LED 4. In this way, the LEDs 2 and 4 are visible both from the front and from the side. When the user turns to the side, LED 6 would also be visible, and so would at least one of LEDs 2 and/or 4 (e.g., depending on the angle, tilt, orientation, and/or position). The rear section 102b is also shown connected to the headband 102c.

FIG. 6B shows the HMD 102 when the front unit is facing the camera. In this example, if the user if facing down, it is possible that at times only LEDs 1 and 2 would be visible. However, if the user locks up, LEDs 3 and 4 would be visible with LEDs 1 and 2, depending on the orientation of the user's head with respect to the camera 108. FIG. 6C shows a top view, wherein the LEDs 1 and 2 and 6 and 5 may be viewable. Also shown is the adjuster on the rear section 102*b*. Further shown is the headband portion 102*d*, which may be a second headband used to provide additional support and comfort. Headband portion 102*d* has its own adjuster, yet that adjuster may not usually affect the spatial physical position of the rear LEDs relative to the front LEDs.

Figure 7:
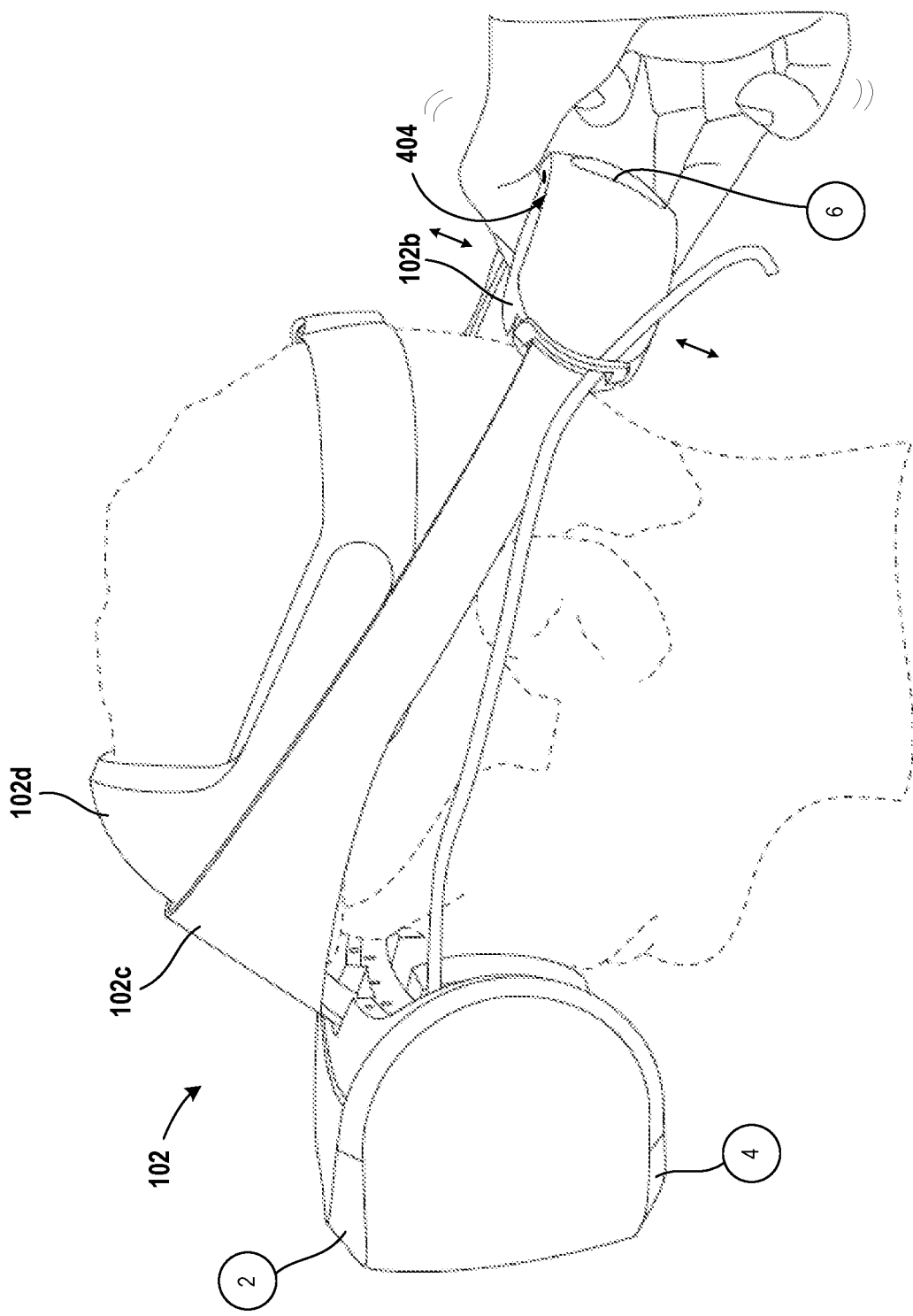
FIG. 7 shows a side view of the HMD, showing that sometimes the headband can be pulled and/or twisted, which can trigger a need for recalibration of the estimated separation distance, in accordance with one embodiment.

FIG. 7 shows a side view of the HMD. In this example, it is shown that the rear section 102*b*, which has the adjuster 404, can sometimes be pulled on or can twist. Such changes can cause adjustments in the calibrated positioning of the rear LEDs relative to the front LEDs. In such a case, adjustment or updates to the calibrated separation distance can be made, and the geometric model of the HMD updated as well.

Figure 8:
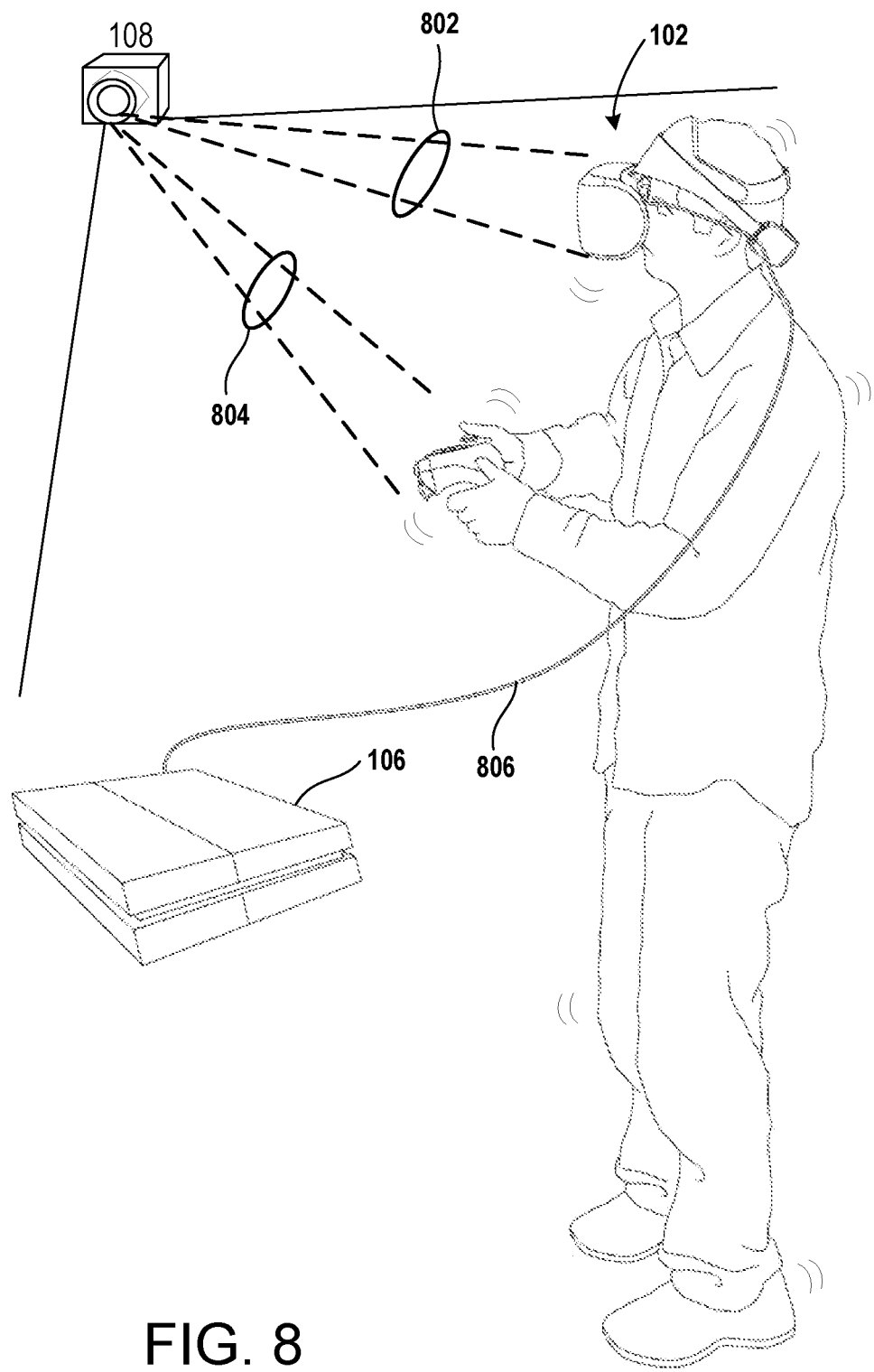
FIG. 8 illustrates a user wearing the HMD, during use (e.g., game play), in accordance with one embodiment.

FIG. 8 illustrates a user wearing the HMD 102, during use, in accordance with one embodiment. In this example, it is shown that the HMD is tracked 802 using image data obtained from captured video frames by the camera 108. Additionally, it is shown that the controller can also be tracked 804 using image data obtained from captured video frames by the camera 108. Also shown is the configuration where the HMD is connected to the computing system 106 via a cable 806. In one embodiment, the HMD obtains power from the same cable or can connect to another cable. In still another embodiment, the HMD can have a battery that is rechargeable, so as to avoid extra power cords.

Figure 9:
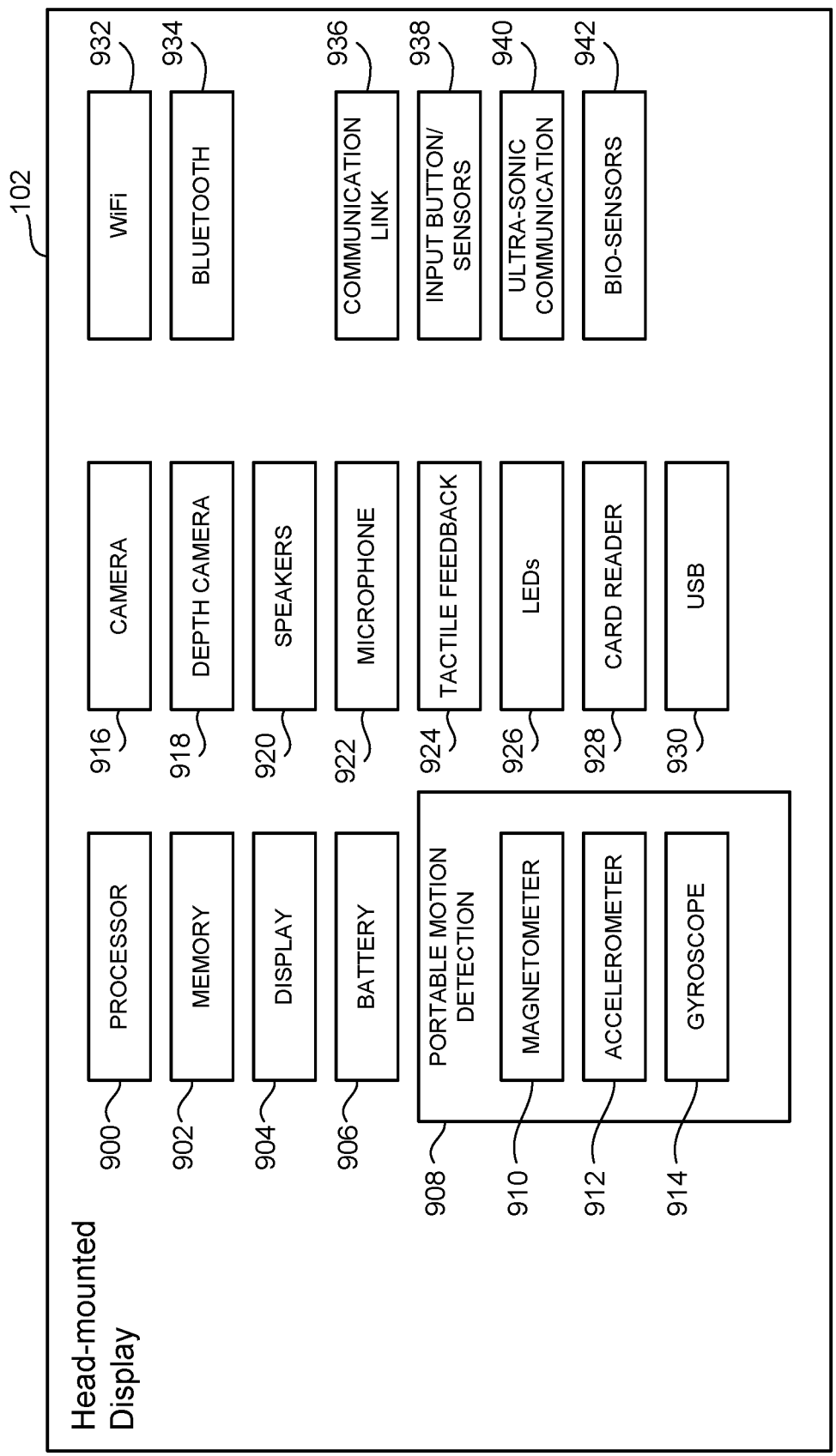
FIG. 9 is a diagram illustrating example components of a head-mounted display 102, in accordance with an embodiment of the invention.

With reference to FIG. 9, a diagram is shown illustrating example components of a head-mounted display 102, in accordance with an embodiment of the invention. It should be understood that more or less components can be included or excluded from the HMD 102, depending on the configuration and functions enabled. The head-mounted display 102 may include a processor 900 for executing program instructions. A memory 902 is provided for storage purposes, and may include both volatile and non-volatile memory. A display 904 is included which provides a visual interface that a user may view.

The display 904 can be defined by one single display, or in the form of a separate display screen for each eye. When two display screens are provided, it is possible to provide left-eye and right-eye video content separately. Separate presentation of video content to each eye, for example, can provide for better immersive control of three-dimensional (3D) content. As described above, in one embodiment, the second screen 107 is provided with second screen content of the HMD 102 by using the output for one eye, and then formatting the content for display in a 2D format. The one eye, in one embodiment, can be the left-eye video feed, but in other embodiments it can be the right-eye video feed.

A battery 906 may be provided as a power source for the head-mounted display 102. In other embodiments, the power source can include an outlet connection to power. In other embodiments, an outlet connection to power and a battery 906 may be provided. A motion detection module 908 may include any of various kinds of motion sensitive hardware, such as a magnetometer 910, an accelerometer 912, and a gyroscope 914.

An accelerometer is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers 912 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 910 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 912 is used together with magnetometer 910 to obtain the inclination and azimuth of the head-mounted display 102.

A gyroscope is a device for measuring or maintaining orientation, based on the principles of angular momentum. In one embodiment, three gyroscopes 914 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 916 is provided for capturing images and image streams of a real environment. More than one camera (optionally) may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 918 may be included in the head-mounted display 102 for sensing depth information of objects in a real environment.

The head-mounted display 102 includes speakers 920 for providing audio output. Also, a microphone 922 may be included for capturing audio from the real environment, including sounds from the ambient environment, speech made by the user, etc. The head-mounted display 102 includes tactile feedback module 924 for providing tactile feedback to the user. In one embodiment, the tactile feedback module 924 is capable of causing movement and/or vibration of the head-mounted display 102 so as to provide tactile feedback to the user.

LEDs 926 are provided as visual indicators of statuses of the head-mounted display 102. For example, an LED may indicate battery level, power on, etc. A card reader 928 is provided to enable the head-mounted display 102 to read and write information to and from a memory card. A USB interface 930 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 932 may be included for enabling connection to the Internet via wireless networking technologies. Also, the head-mounted display 102 may include a Bluetooth module 934 for enabling wireless connection to other devices. A communications link 936 may also be included for connection to other devices. In one embodiment, the communications link 936 utilizes infrared transmission for wireless communication. In other embodiments, the communications link 936 may utilize any of various wireless or wired transmission protocols for communication with other devices.

Input buttons/sensors 938 are included to provide an input interface for the user. Any of various kinds of input interfaces may be included, such as buttons, gestures, touchpad, joystick, trackball, etc. An ultra-sonic communication module 940 may be included in head-mounted display 102 for facilitating communication with other devices via ultrasonic technologies.

Bio-sensors 942 are included to enable detection of physiological data from a user. In one embodiment, the bio-sensors 942 include one or more dry electrodes for detecting bio-electric signals of the user through the user's skin, voice detection, eye retina detection to identify users/profiles, etc.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

In one embodiment, clients and/or client devices, as referred to herein, may include head mounted displays (HMDs), terminals, personal computers, game consoles, tablet computers, telephones, set-top boxes, kiosks, wireless devices, digital pads, stand-alone devices, handheld game playing devices, and/or the like. Typically, clients are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to client or on a separate device such as a monitor or television.

Clients are optionally configured to support more than one game player. For example, a game console may be configured to support two, three, four or more simultaneous players (e.g., P1, P2, . . . Pn). Each of these players may receive or share a video stream, or a single video stream may include regions of a frame generated specifically for each player, e.g., generated based on each player's point of view. Any number of clients can be local (e.g., co-located) or are geographically dispersed. The number of clients included in a game system may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user.

For example, a game console and an HMD may cooperate with the video server system to deliver a game viewed through the HMD. In one embodiment, the game console receives the video stream from the video server system and the game console forwards the video stream, or updates to the video stream, to the HMD and/or television for rendering.

Still further, the HMD can be used for viewing and/or interacting with any type of content produced or used, such video game content, movie content, video clip content, web content, advertisement content, contest content, gamboling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content can be rendered so long as it can be viewed in the HMD or rendered to a screen or screen of the HMD.

Clients may, but are not required to, further include systems configured for modifying received video. For example, a client may be configured to perform further rendering, to overlay one video image on another video image, to crop a video image, and/or the like. For example, clients may be configured to receive various types of video frames, such as I-frames, P-frames and B-frames, and to process these frames into images for display to a user. In some embodiments, a member of clients is configured to perform further rendering, shading, conversion to 3-D, conversion to 2D, distortion removal, sizing, or like operations on the video stream. A member of clients is optionally configured to receive more than one audio or video stream.

Input devices of clients may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

A video source may include rendering logic, e.g., hardware, firmware, and/or software stored on a computer readable medium such as storage. This rendering logic is configured to create video frames of the video stream based on the game state. All or part of the rendering logic is optionally disposed within one or more graphics processing unit (GPU). Rendering logic typically includes processing stages configured for determining the three-dimensional spatial relationships between objects and/or for applying appropriate textures, etc., based on the game state and viewpoint. The rendering logic can produce raw video that is encoded. For example, the raw video may be encoded according to an Adobe Flash® standard, HTML-5, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a device. The video stream is characterized by a frame size and a frame rate. Typical frame sizes include 800×600, 1280×720 (e.g., 720p), 1024×768, 1080p, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, the client can be a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 10:
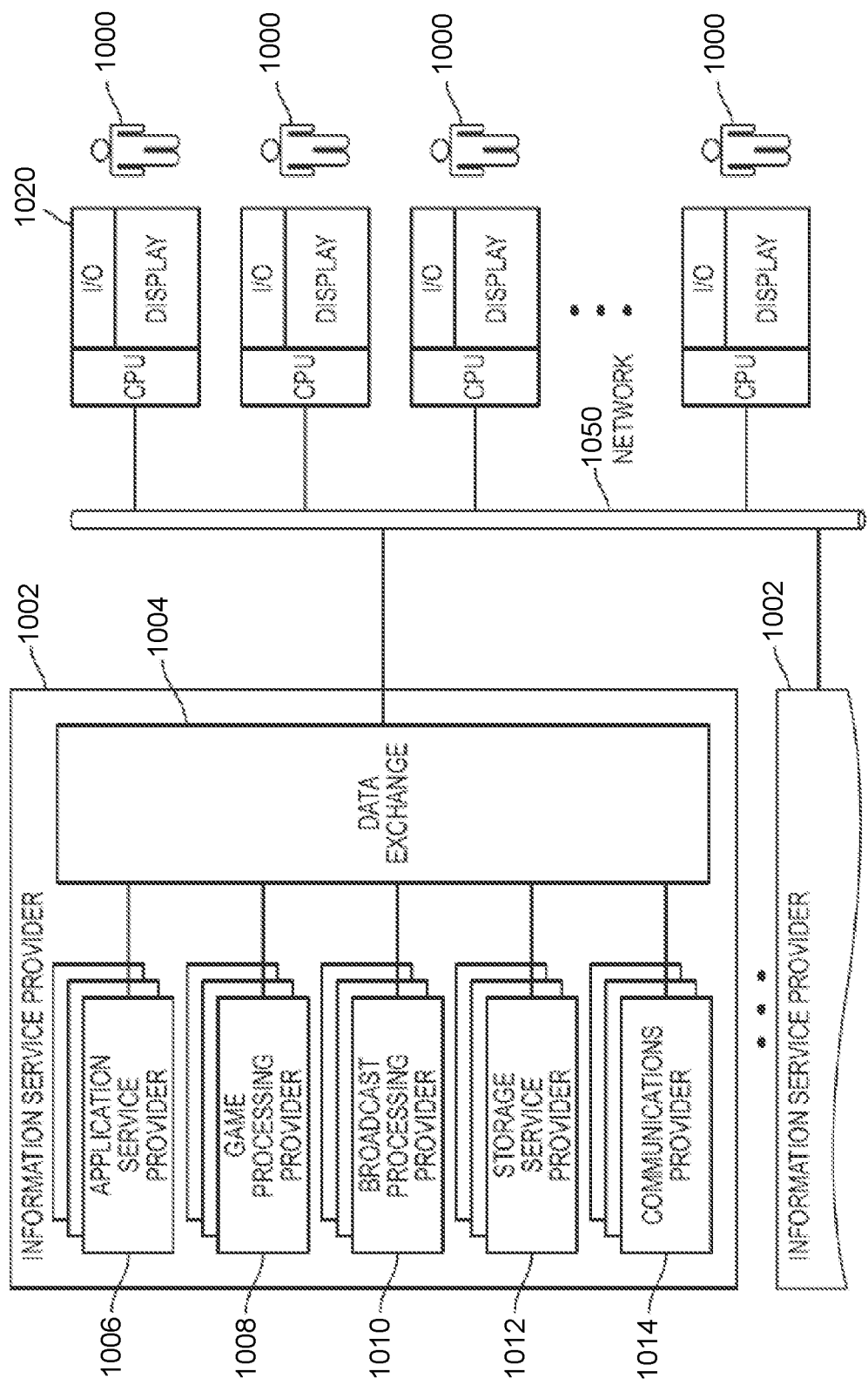
FIG. 10 illustrates components of a head-mounted display, in accordance with an embodiment of the invention.

FIG. 10 illustrates an embodiment of an Information Service Provider architecture. Information Service Providers (ISP) 1070 delivers a multitude of information services to users 1082 geographically dispersed and connected via network 1086. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1070 includes Application Service Provider (ASP) 1072, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as html, to access ISP 1070.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A head mounted display, comprising:
an optics block includes a display screen;
a band adjustment unit located opposite the optics block;
a headband having a front portion and an adjustable portion, wherein the front portion of the headband having a connection to the optics block at a center location, the connection is adjustable to provide for an adjustment gap that enables sliding the optics block out to extend away from the headband and slides the optics block in to contract toward the headband, wherein the headband extends along a downward angle from the front portion that is positioned substantially above the optics block and toward the adjustable portion, the downward angle is along a straight line positioned at a substantial center of a side of the headband and extending from an approximate upper mid-point of the front portion to an approximate lower mid-point of the adjustable portion; and
a pad disposed inside of the front portion of the headband, the pad provides for at least partial support of the optics block when the head mounted display is worn by a user;
wherein the downward angle of the headband provides for the front portion to be placed proximate to a forehead of a head of the user and the adjustable portion to be placed proximate to a back lower region of the head of the user;
wherein the head mounted display includes an open region that leaves an apex of a mid-scalp region of the user's head uncovered.

2. The head mounted display of claim 1, wherein the band adjustment unit includes a rotary wheel that turns to contract a size or expand the size of the headband.

3. The head mounted display of claim 2, wherein to contract the size of the headband a portion of the headband moves into the band adjustment unit and to expand the size of the headband another portion of the headband moves out of the band adjustment unit.

4. The head mounted display of claim 1, wherein the optics block 1s configured to hang below the front portion of the headband.

5. The head mounted display of claim 1, wherein the adjustable portion of the headband is curved and includes a padded inner surface.

6. The head mounted display of claim 1, wherein the adjustable portion of the headband is disposed in the band adjustment unit, the band adjustment unit having a curved inner surface to be disposed proximate to a lower rear portion of a head of the user.

7. The head mounted display of claim 1, wherein the band adjustment unit includes one or more of a wheel adjuster, or a belt adjuster, or a notched adjuster, or a pin and hole adjuster, or a snap adjuster, or a Velcro adjuster, or a tape adjuster, or a belt and buckle adjuster, or a rope adjuster, or a link connector adjuster, or an elastic adjuster, or a clip adjuster, or a lock adjuster, or a combination of two or more thereof.

* * * * *